US012789546B1

(12) United States Patent
Kraft

(10) Patent No.: US 12,789,546 B1
(45) **Date of Patent: *Nov. 10, 2026**

(54) TAMPER EVIDENT FORM AND LABEL SYSTEM

(71) Applicant: Rekon, LLC, Pittsburg, KS (US)

(72) Inventor: Roger E. Kraft, Fort Scott, KS (US)

(73) Assignee: Rekon, LLC, Pittsburg, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/196,565

(22) Filed: May 1, 2025

Related U.S. Application Data

(63) Continuation-in-part of application No. 18/407,801, filed on Jan. 9, 2024, which is a continuation of application No. 29/869,794, filed on Jan. 9, 2023, now Pat. No. Des. 1,067,970, and a continuation of application No. 29/866,068, filed on Aug. 26, 2022, now Pat. No. Des. 1,016,148.

(60) Provisional application No. 63/643,259, filed on May 6, 2024, provisional application No. 63/479,132, filed on Jan. 9, 2023.

(51) Int. Cl.
*B42D 25/47* (2014.01)

(52) U.S. Cl.
CPC .................................... *B42D 25/47* (2014.10)

(58) Field of Classification Search
None
See application file for complete search history.

(56) References Cited

U.S. PATENT DOCUMENTS

| | | | |
|---|---|---|---|
| 2,128,196 | A | 8/1938 | Vogel |
| 5,174,491 | A | 12/1992 | Taylor et al. |
| 5,253,798 | A | 10/1993 | Lombardo |
| 5,294,041 | A | 3/1994 | Whiteside |
| 5,376,048 | A | 12/1994 | Whiteside |
| 5,829,670 | A | 11/1998 | Lombardo et al. |
| 5,893,512 | A | 4/1999 | Diedrich |

(Continued)

FOREIGN PATENT DOCUMENTS

| | | | |
|---|---|---|---|
| CA | 2355474 | A1 | 4/2002 |
| WO | 2014181113 | A2 | 11/2014 |

OTHER PUBLICATIONS

Final Office Action, dated Oct. 20, 2025, 19 pages, issued in U.S. Appl. No. 18/407,801.

(Continued)

*Primary Examiner* — Kristy A Haupt
(74) *Attorney, Agent, or Firm* — AVEK IP, LLC

(57) ABSTRACT

A form may include a first panel, a second panel, and a third panel. A form may include a first intermediate portion arranged between the second panel and the first panel, and a second intermediate portion arranged between the second panel and the third panel. A form may include a perimeter portion arranged outboard each of the panels. A form may include a first set of attachment features adjacent the first panel and located within the perimeter portion and the first intermediate portion. A form may include a second set of attachment features adjacent the second panel and located within the perimeter portion and the second intermediate portion. A form may include a first set of die cuts arranged overlappingly on the first set of attachment features. The first set of attachment features is configured to secure to the second set of attachment features.

20 Claims, 25 Drawing Sheets

(56) References Cited

U.S. PATENT DOCUMENTS

| | | | | |
|---|---|---|---|---|
| 5,950,909 | A | 9/1999 | Peterson et al. | |
| 6,095,407 | A | 8/2000 | Ward et al. | |
| 6,131,802 | A * | 10/2000 | Lombardo | B42D 15/08 229/92.1 |
| 6,196,453 | B1 | 3/2001 | Hutchinson | |
| 6,431,437 | B1 | 8/2002 | Lombardo et al. | |
| 6,983,875 | B2 | 1/2006 | Emmott | |
| 10,046,588 | B2 | 8/2018 | Coulter | |
| D966,406 | S | 10/2022 | Pickett, III et al. | |
| D987,717 | S | 5/2023 | Ridge et al. | |
| D989,861 | S | 6/2023 | Dobak, III et al. | |
| D1,016,148 | S | 2/2024 | Bosley et al. | |
| D1,067,970 | S | 3/2025 | Kraft et al. | |
| 2005/0082354 | A1 | 4/2005 | Black | |
| 2007/0090173 | A1 | 4/2007 | Yost | |
| 2012/0241508 | A1* | 9/2012 | Morris | B42D 15/08 229/75 |
| 2015/0165810 | A1 | 6/2015 | Morris | |

OTHER PUBLICATIONS

How to Use Pressure Seal Forms to Streamline Mail Communication—YouTube. Date first available Aug. 19, 2020. Site visited Jul. 1, 2024. Available online httpswww.youtube.comwatchv=wgPSzdWaWUw (Year 2020).

Non-Final Office Action, dated May 15, 2025, 15 pages, issued in U.S. Appl. No. 18/407,801.

Pressure Seal Forms—Paragon Print Systems Inc. Date first available: Jun. 15, 2021. Site visited: Jul. 1, 2024. Available online: https://www.paragonprintsystems.com/custom-forms/pressure-seal-forms (Year: 2021).

Notice of Allowanced, dated Feb. 10, 2026, 5 pages, issued in U.S. Appl. No. 30/003,762.

* cited by examiner

TAMPER EVIDENT FORM AND LABEL SYSTEM

RELATED APPLICATIONS

This application is a continuation-in-part of U.S. Non-Provisional application Ser. No. 18/407,801, filed Jan. 9, 2024, which claims the benefit of U.S. Provisional Application No. 63/479,132, filed Jan. 9, 2023. The '801 application also claims priority to U.S. Design patent application Ser. No. 29/869,794, filed Jan. 9, 2023, which has issued as U.S. Patent No. D1067970, and to U.S. Design patent application Ser. No. 29/866,068, filed Aug. 26, 2022, which has issued as U.S. Patent No. D1016148. This application also claims the benefit of priority of U.S. Provisional Application No. 63/643,259, filed on May 6, 2024. The disclosure of these applications is incorporated by reference in their entirety.

FIELD OF THE DISCLOSURE

The disclosure relates generally to the field of pressure sealed forms having label features. Specifically, the disclosure relates to pressure sealed forms having an adhesive and liner for adhering to a substrate.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

In some aspects, the techniques described herein relate to a tamper evident form, the form including a first panel, a second panel, and a third panel. The form includes a first intermediate portion arranged between the second panel and the first panel, and a second intermediate portion arranged between the second panel and the third panel. The form includes a perimeter portion arranged outboard each of the first panel, the second panel, and the third panel. The form includes a first set of attachment features located within the perimeter portion and the first intermediate portion, the first set of attachment features being adjacent the first panel. The form includes a second set of attachment features located within the perimeter portion and the second intermediate portion, the second set of attachment features being adjacent the second panel. The form includes a first set of die cuts arranged overlappingly on the first set of attachment features. The first set of attachment features is configured to secure to the second set of attachment features.

In some aspects, the techniques described herein relate to a tamper evident form, wherein the first set of attachment features and the second set of attachment features are cohesive.

In some aspects, the techniques described herein relate to a tamper evident form, wherein the first set of attachment features is exclusively located within the perimeter portion and the first intermediate portion, and the second set of attachment features is exclusively located within the perimeter portion and the second intermediate portion.

In some aspects, the techniques described herein relate to a tamper evident form, further including a third set of attachment features located within the perimeter portion and the second intermediate portion, the third set of attachment features being adjacent the third panel. The form further includes a fourth set of attachment features located within the perimeter portion and the second intermediate portion, the fourth set of attachment features being adjacent the second panel.

In some aspects, the techniques described herein relate to a tamper evident form, wherein the first set of attachment features and the second set of attachment features reside on a first side of the tamper evident form, and the third set of attachment features and the fourth set of attachment features reside on a second side of the tamper evident form.

In some aspects, the techniques described herein relate to a tamper evident form, wherein each of the first set of die cuts has a generally semi-ovular shape.

In some aspects, the techniques described herein relate to a tamper evident form, wherein each of the first set of die cuts has an open shape.

In some aspects, the techniques described herein relate to a tamper evident form, wherein the tamper evident form includes paper.

In some aspects, the techniques described herein relate to a tamper evident form, wherein the first panel includes security indicia.

In some aspects, the techniques described herein relate to a tamper evident form, wherein each of the first panel, the second panel, and the third panel is configured to be printable.

In some aspects, the techniques described herein relate to a tamper evident form, wherein each of the first panel and the third panel are configured to be foldable against the second panel.

In some aspects, the techniques described herein relate to a tamper evident form, further including strips of adhesive and strips of release material, each of the strips of adhesive and the strips of release material being arranged in the perimeter portion of the third panel.

In some aspects, the techniques described herein relate to a tamper evident form, further including a layer of adhesive and a layer of release material, each of the layer of adhesive and the layer of release material being arranged over an entirety of a side of the third panel.

In some aspects, the techniques described herein relate to a tamper evident form, further including a second set of die cuts arranged overlappingly on the second set of attachment features.

In some aspects, the techniques described herein relate to a tamper evident form, the form including a first panel and a second panel. The form includes a perimeter portion arranged outboard each of the first panel and the second panel. The form includes a first set of attachment features located within the perimeter portion and being adjacent the first panel on a form first side. The form includes a second set of attachment features located within the perimeter portion and being adjacent the second panel on the form first side. The form includes a first set of die cuts arranged overlappingly on the first set of attachment features. The first set of attachment features is configured to secure to the second set of attachment features.

In some aspects, the techniques described herein relate to a tamper evident form, further including strips of adhesive and strips of release material, each of the strips of adhesive and the strips of release material being arranged in the perimeter portion of the second panel on a form second side.

In some aspects, the techniques described herein relate to a tamper evident form, wherein the first set of attachment features and the second set of attachment features are cohesive.

In some aspects, the techniques described herein relate to a tamper evident form, wherein each of the first set of die cuts has a generally open semi-ovular shape.

In some aspects, the techniques described herein relate to a tamper evident form, the form including a first panel and a second panel. The form includes a perimeter portion arranged outboard each of the first panel and the second panel. The form includes a first set of attachment features located within the perimeter portion and being adjacent the first panel on a form first side. The form includes a second set of attachment features located within the perimeter portion and being adjacent the second panel on the form first side. The form includes an adhesive strip arranged in the perimeter portion on a form second side. The form includes a release material strip arranged in the perimeter portion on the form second side. The form includes a first set of die cuts arranged overlappingly on the first set of attachment features. The first set of attachment features is configured to secure to the second set of attachment features.

In some aspects, the techniques described herein relate to a tamper evident form, wherein the adhesive strip is arranged adjacent the first panel and the release material strip is arranged adjacent the second panel.

BRIEF DESCRIPTION OF THE SEVERAL VIEWS OF THE DRAWINGS

Illustrative embodiments of the invention are described in detail below with reference to the attached drawing figures.

DETAILED DESCRIPTION

The subject matter of select exemplary embodiments is described with specificity herein to meet statutory requirements. But the description itself is not intended to necessarily limit the scope of any claims hereinafter written. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" or "substantially" as used herein denote deviations from the exact value by +/−10%, preferably by +/−5% and/or deviations in the form of changes that are insignificant to the function.

Security forms for protecting contents (e.g., printed matter, pieces of paper, et cetera) of the form from unwanted viewers are known in the art. These forms may be folded on themselves one or more times to retain their contents. To remain in the folded configuration, the form may make use of an adhesive to adhere portions of itself together. The conventional form portions are typically secured via the adhesive through the use a high-pressure machine pressing upon the form. The contents of these forms are generally sensitive in nature, and it is critical to prevent anyone who is not the intended recipient from viewing this information. Typically, these forms rely on security indicia to block or prevent persons from viewing the contents from the outside (i.e., without having to open the form).

The end user may observe whether the form is torn to determine if others have opened the form and viewed the contents. Unauthorized persons may circumvent these security measures by using a thin or sharp implement (e.g., a knife) to separate the adhesive bonds and access the contents of the form (e.g., without tearing the form). Because the form is not torn, the unauthorized person may reseal the form with adhesive and the end user may be none the wiser of the breach in security. Embodiments of a tamper evident form discussed herein may allow for such tampering to be detected and avoided. Still more embodiments of a form and label system discussed herein may allow for the advantageous combination of pressure seal features with label features to provide for a pressure seal form that may be readily adhered to a surface or substrate.

Figure 1:
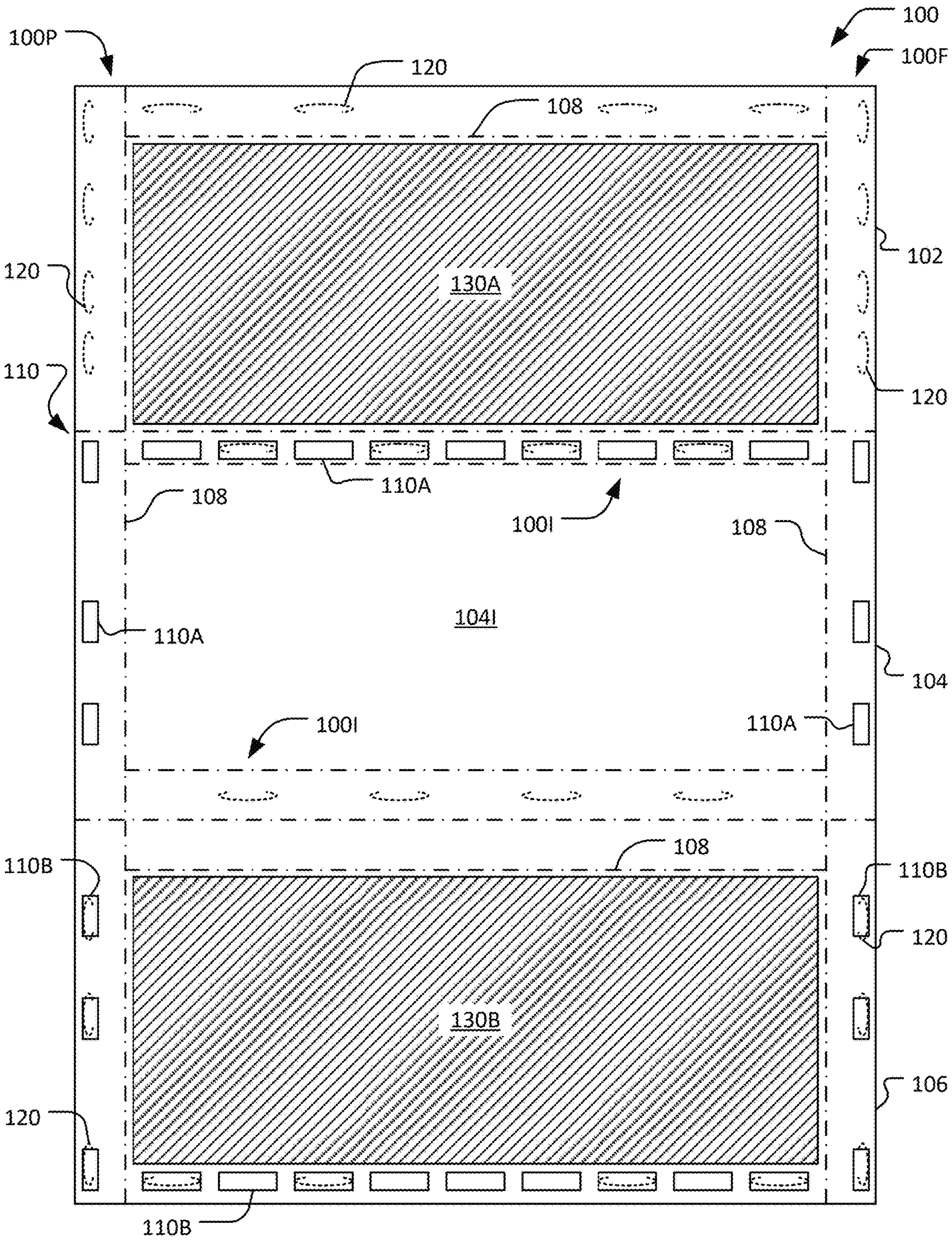
FIG. 1 shows a front view of a form employing tamper evident features, in an unfolded configuration, according to an embodiment of the disclosure.
Figure 2:
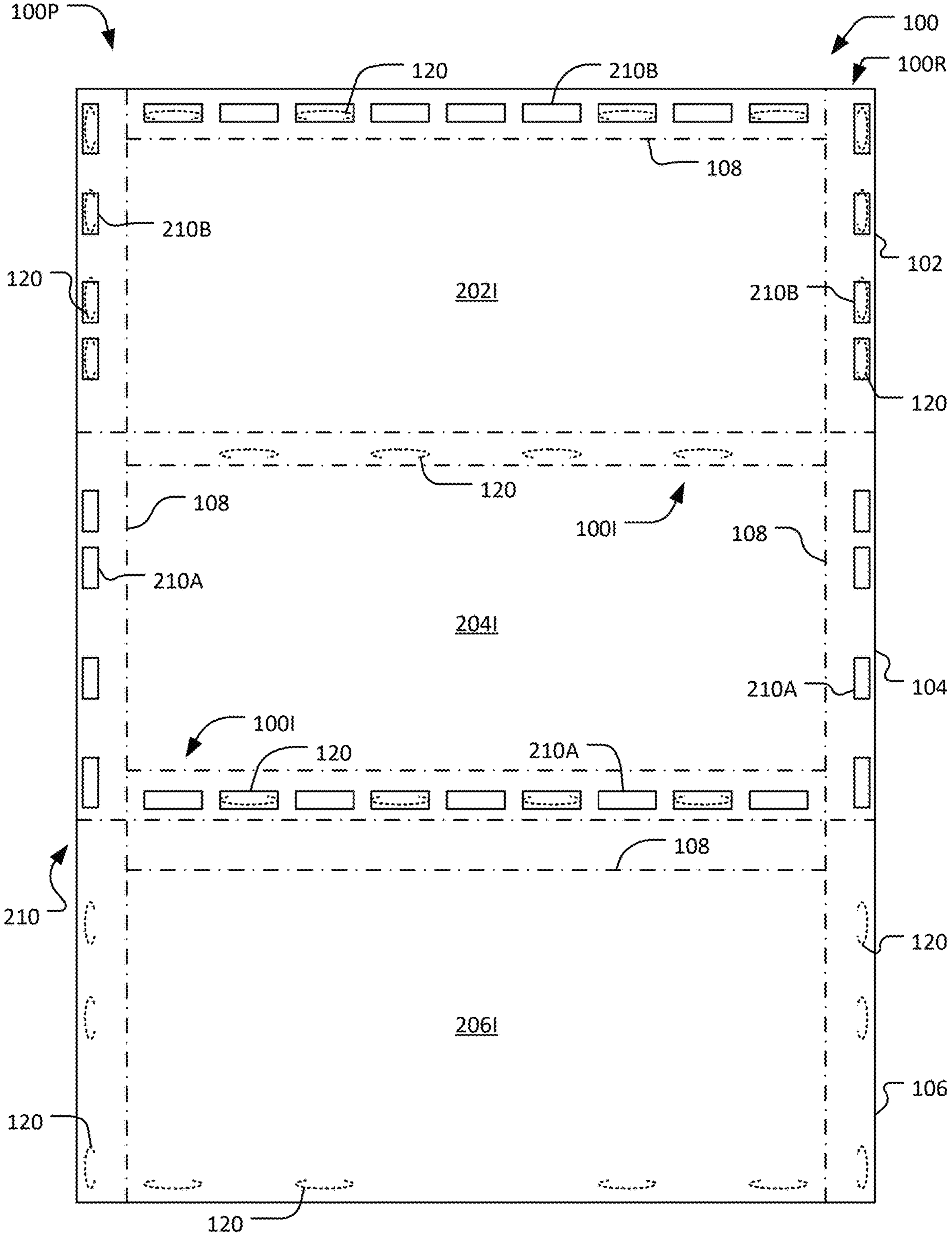
FIG. 2 shows a rear view of the form employing the tamper evident features of FIG. 1, in the unfolded configuration.
Figure 3A:
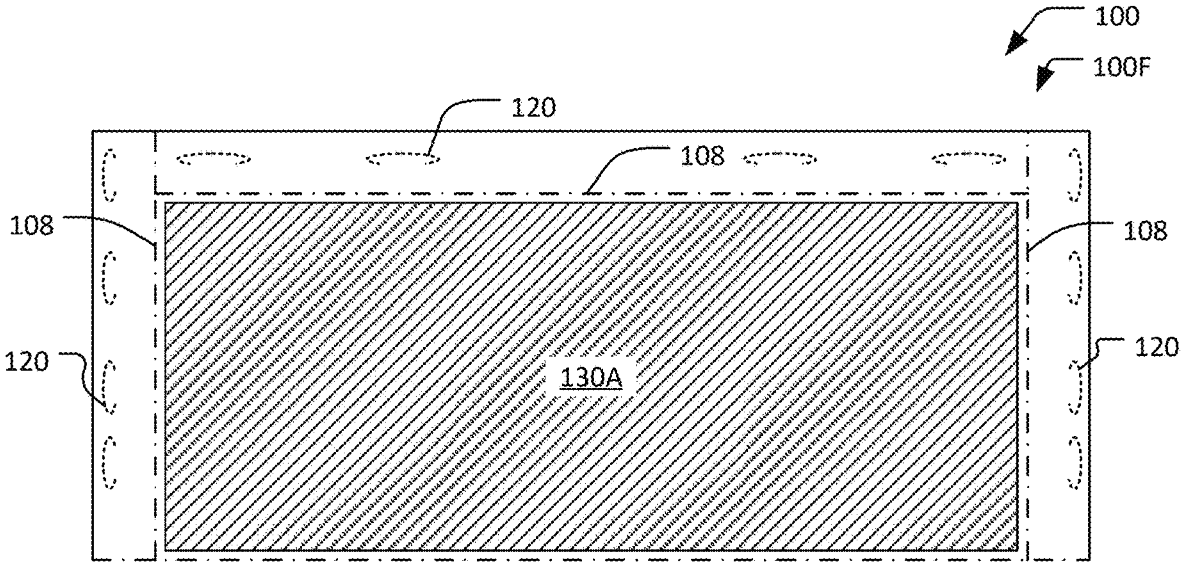
FIG. 3A shows a front view of the form employing the tamper evident features of FIG. 1, in a folded configuration.
Figure 3B:
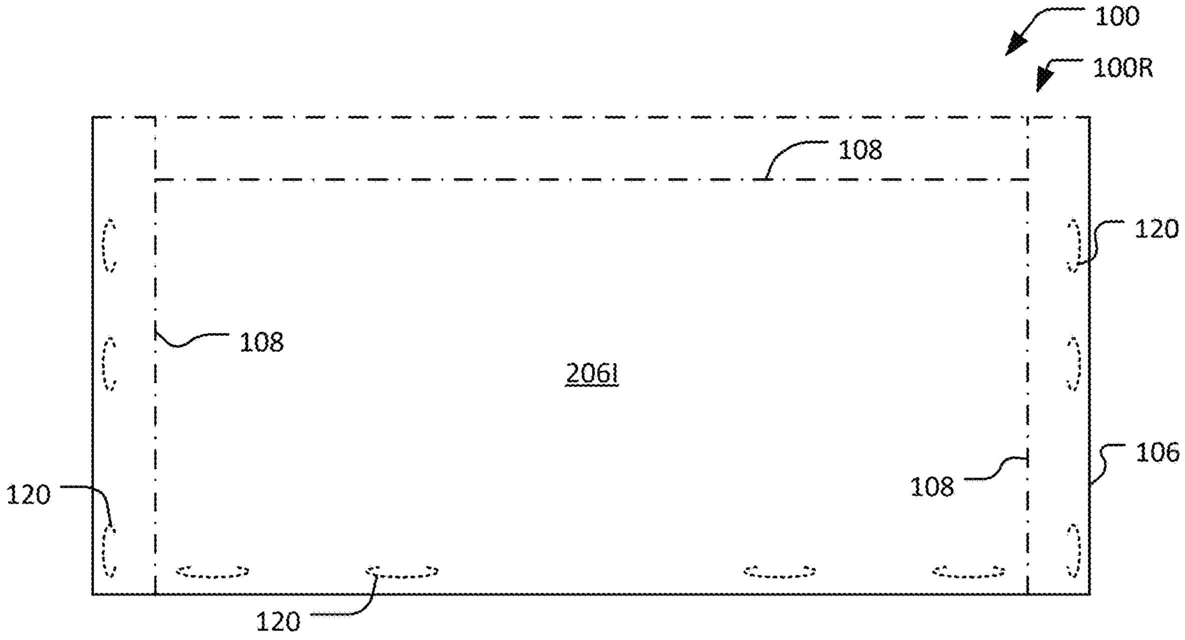
FIG. 3B shows a rear view of the form employing the tamper evident features of FIG. 1, in the folded configuration.

FIGS. 1 and 2 depict an embodiment 100 of a tamper evident form, in an unfolded configuration, for use in protecting information or other contents. FIGS. 3A and 3B depict the form 100 in a folded configuration. The form 100 may be constructed of any suitable material now known or subsequently developed, such as paper, card stock, plastic card, cardboard, polyester, et cetera. The information that is intended to be protected may be printed directly onto the form 100. Alternately or additionally, in embodiments, the form 100 may function as an envelope and retain therein separate contents or materials (e.g., a card, a sheet of paper, etc.) having information. The form 100 may comprise a first panel 102, a second panel 104, a third panel 106, lines of weakness or perforations 108, a plurality, or sets, of attachment features 110 and 210 (FIG. 2), and a plurality of die cuts 120. The perforations 108 may define each of the panels 102, 104, and 106, (e.g., a boundary of each thereof) as well as perimeter portions 100P outboard the panels 102, 104, and 106, and intermediate portions 1001. The perforations 108 may be exploited by a user to bend and/or tear away portions of the form 100. The attachment features 110 may be used to secure the form 100 in the folded configuration. The die cuts 120 may be used to indicate to the user if someone had attempted to access the information of a folded form 100, as will be discussed in further detail below. Embodiments of the form 100 may include further security features, such as security indicia 130A and 130B.

As shown in the figures here, the form 100 may have a trifold configuration, where the form 100 may be folded twice in the folded configuration. However, the artisan understands that embodiments of the form 100 may instead be configured to be folded any number of suitable times, such as just once in a bifold configuration.

Focusing now on FIG. 1, showing a form front side 100F, the form 100 may be configured to receive indicia (e.g., printed text, images, et cetera) on any or all of the panels 102, 104, and 106. For example, the form 100 may have a section 1041 that is configured to receive printed indicia via a printable coating. The indicia printed may include sensitive information that is intended for a particular recipient of the form 100. For example, the indicia may be personal or private information which is intended only to be viewed by a particular person. The form 100 may include a printable coating configured to receive indicia of the desired type of printing (e.g., laser printing, inkjet printing, direct thermal printing, et cetera). Likewise, the panels 102, 104, and 106 may have indicia printed alternately or additionally on a rear side 100R thereof (FIG. 2) (e.g., in the sections 2021, 204I, and/or 2061).

In some embodiments, one or more of the panels 102, 104, or 106 may have security indicia (e.g., security indicia 130A and 130B) printed thereon. The security indicia 130A and 130B may be any suitable pattern of indicia configured to mitigate the ability of a person to view (e.g., optically or with other imaging technology) the otherwise obscured contents of the form 100 when in the folded configuration (e.g., through one or layers of the form 100).

The attachment features 110 and 210 may be used to secure the panels 102, 104, and 106 together when the form 100 is in the folded configuration. The attachment features 110 and 210 may comprise, for example, adhesive for fixedly securing the panels 102, 104, 106 together. In embodiments, the attachment features 110 and 210 may have a cohesive nature. That is to say, the attachment features 110 and 210 may be configured to fixedly secure (e.g., via a pressure sensitive adhesive) to other attachment features 110 and 210 when brought into contact and pressed together. Therefore, each of the attachment features 110 and 210 may be arranged on the panels 102, 104, and 106 such that each feature 110 and 210 on a given panel 102, 104, and 106 corresponds to another feature 110 and 210 on another panel 102, 104, and 106 on the same side 100F and/or 100R when folded. On the front side 100F, this may mean that each of the attachment features 110A on the panel 104 may have a corresponding attachment feature 110B on the panel 106. For the form 100 rear side 100R (FIG. 2), this may mean that each of the attachment features 210A on the panel 104 may have a corresponding attachment feature 210B on the panel 102. In this way, the form 100 may be pressure sealed (e.g., fixedly secured) in the folded configuration (FIGS. 3A and 3B). The attachment features 110 and 210 may reside exclusively within the perimeter portions 100P and intermediate portions 1001 of the form 100.

An example way to fold the form 100 is as follows. The user may bend the panel 106 along the perforations 108 upwards towards the panel 104 such that the attachment features 110B mate with the attachments features 110A on the form front side 100F. Then, the user may bend the panel 102 along the perforations 108 downwards towards the panel 104 such that the attachment features 210B mate with the attachments features 210A on the form rear side 100R. In this way, only the front side 100F of the panel 102 (FIG. 3A) and the rear side 100R of the panel 106 (FIG. 3B) may be visible from the outside. Note that the attachment features 110 and 210 may not be visible in the folded condition. The panel 104 may be sandwiched between the panel 102 and 106, and both sides 100F and 100R of the panel 104 may be hidden. Afterwards, the end recipient may dissociate the perimeter portions 100P from the form 100 using the perforations 108 to unfold the form 100 and access the information hidden therein (e.g., the information printed therein and/or provided on separate material).

The die cuts 120 may be arranged on, at, and/or near the attachment features 110 and 210 (e.g., overlapping a portion of some or all of the attachment features 110 and 210). In embodiments, and like the attachment features 110 and 210, each of the die cuts 120 may be arranged such that they correspond to (i.e., contact) another die cut 120 when the form 100 is in the folded configuration. In still more embodiments, each of the attachment features 110 and 210 may have die cuts associated therewith. In use, when a person attempts to dissociate attachment features 110 and/or 210 that are secured together, the die cuts 120 located at or near the affected attachments features may be configured to tear from the rest of the form 100, or to otherwise provide for a weakened area of the form 100 which may begin to tear. In this way, when a person attempts to separate the folded together panels 102, 104, and/or 106 from each other, the die cuts 120 may dissociate from or provide tears in the form 100. This may readily provide visual evidence that a form 100 has been tampered with. If the end recipient does not see any such tearing, then the end recipient may be assured that the form 100 was not tampered with prior to having received the form 100. In embodiments, the die cuts 120 may reside exclusively within the perimeter portions 100P and/or intermediate portions 1001 of the form 100.

In embodiments, the die cuts 120 may have an “open” semi-ovular or semi-elliptical shape. That is to say, each of the die cuts 120 may form a partial shape in the form 100 such that an area within each die cut 120 may be continuous with the larger part of the form 100. Die cuts 120 having this “open” shape may more readily provide evidence of tampering than “closed” or complete shapes by making it easier for the form 100 to tear when the panels 102, 104, 106 are prematurely dissociated.

Figure 4:
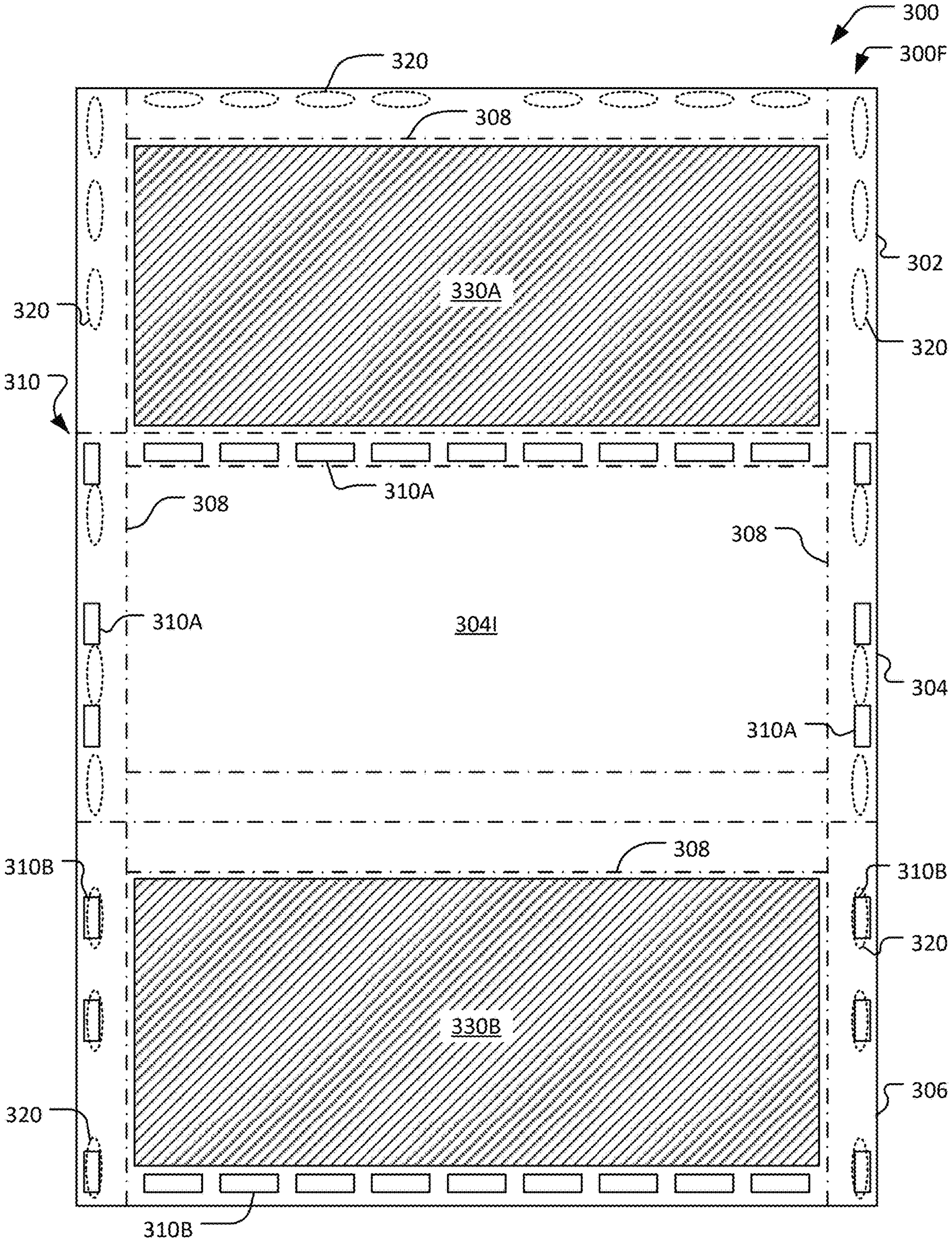
FIG. 4 shows a front view of a form employing tamper evident features, in an unfolded configuration, according to another embodiment of the disclosure.
Figure 5:
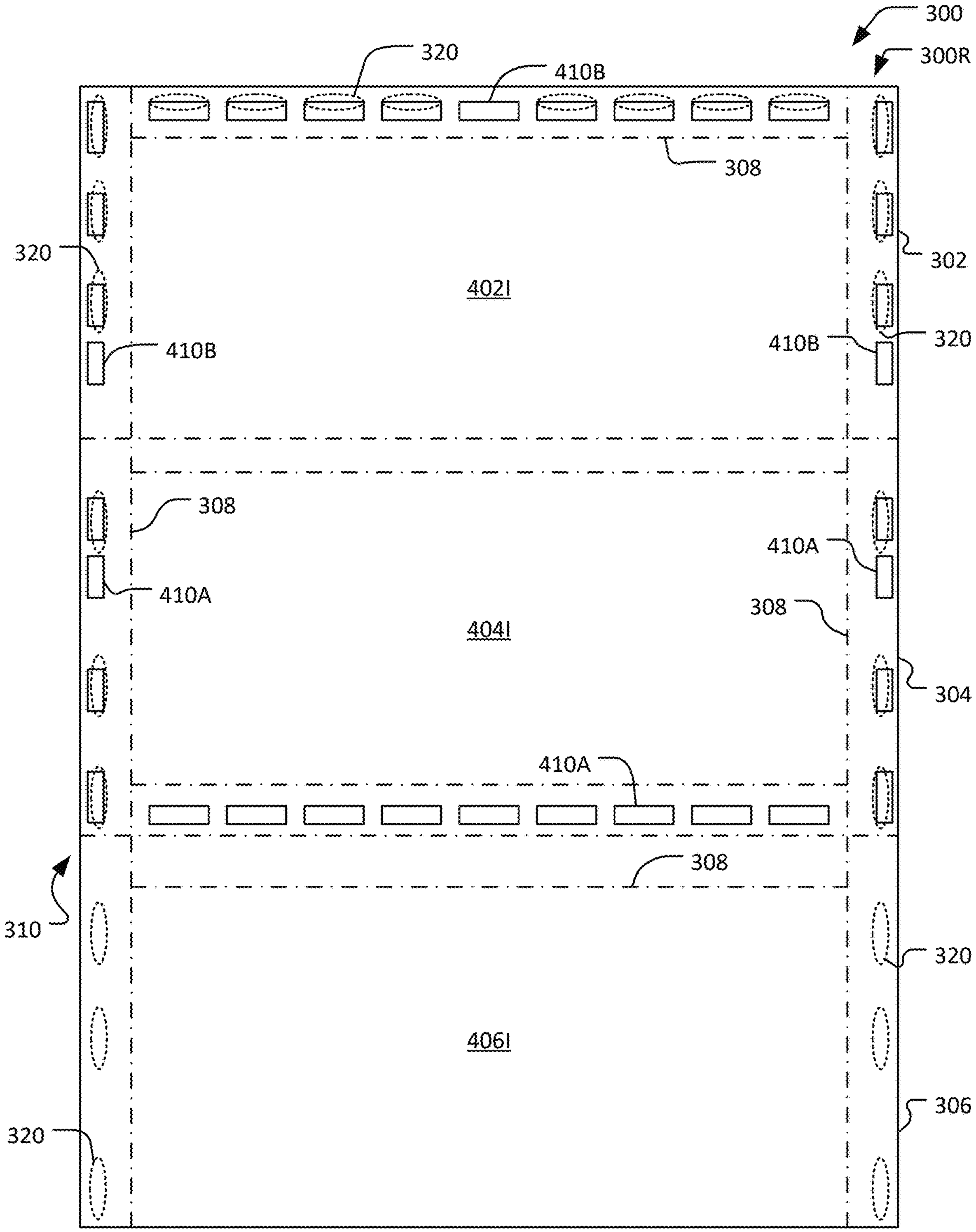
FIG. 5 shows a rear view of the form employing the tamper evident features of FIG. 4, in the unfolded configuration.

FIGS. 4 and 5 depict and embodiment 300 of a tamper evident form that is substantially the same as the form 100, except where explicitly noted or would be implied. The parts similarly numbered may be the same for the embodiment 300 as for the embodiment 100, except that all part numbers that begin with 1______ may instead begin with 3______, and all part numbers that begin with 2______ may instead begin with 4______. One difference between the embodiment 300 and the embodiment 100 is that the embodiment 300 may have a different number and arrangement of the plurality of die cuts 320. The die cuts 320 may also comprise a “closed” shape, where an interior of each of the die cuts 320 is not continuous with a greater area of the form 300. Like the form 100, the form 300 may provide for a more effective tamper evident form than conventional forms.

Figure 6:
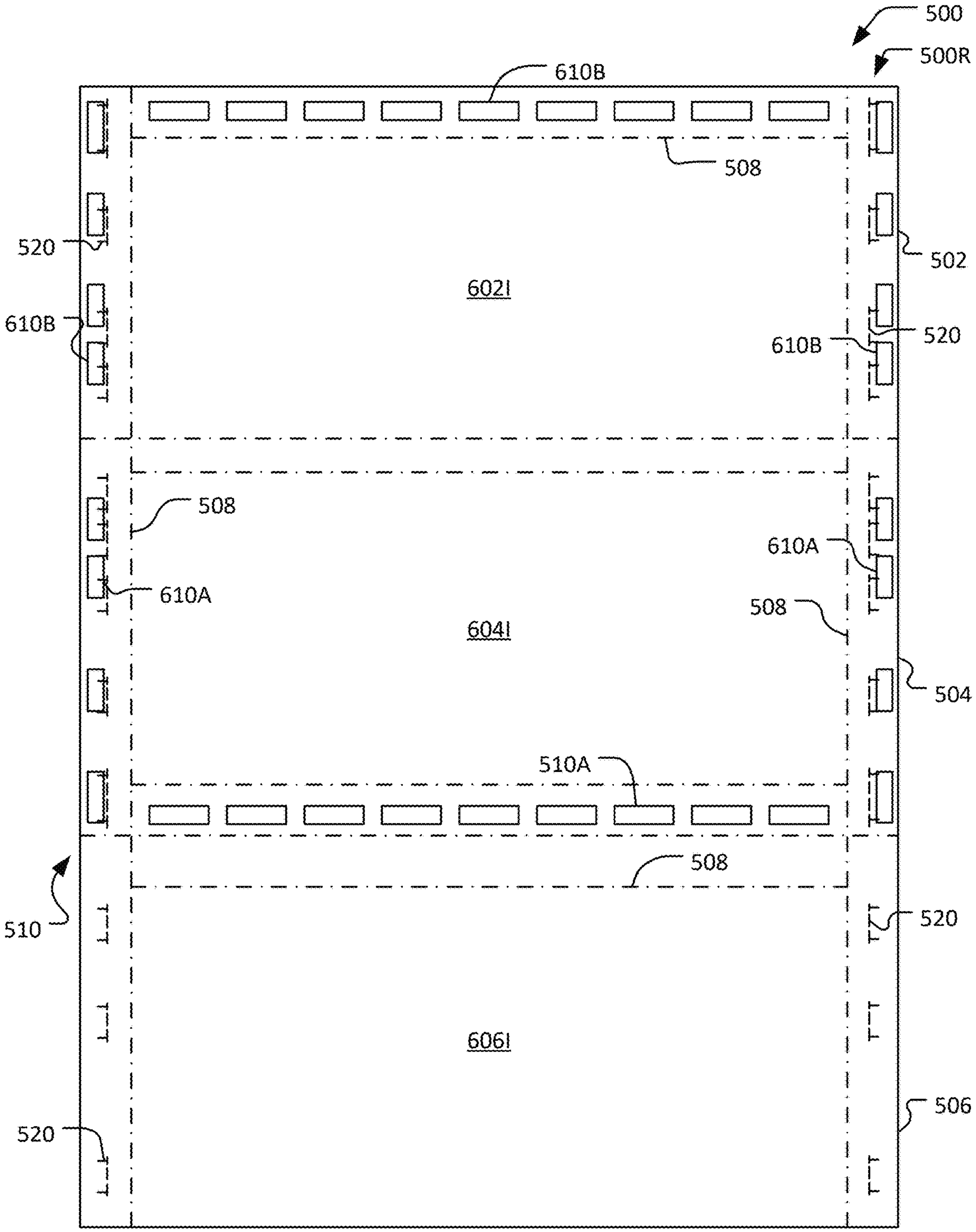
FIG. 6 shows a rear view of a form employing tamper evident features, in an unfolded configuration, according to yet another embodiment of the disclosure.

FIG. 6 depicts a rear side 500R of an embodiment 500 of a tamper evident form that is substantially the same as the form 100, except where explicitly noted or would be implied. The parts similarly numbered may be the same for the embodiment 500 as for the embodiment 100, except that all part numbers that begin with 1______ may instead begin with 5______, and all part numbers that begin with 2______ may instead begin with 6______. One difference between the embodiment 500 and the embodiment 100 is that the embodiment 500 may have a different number and arrangement of the plurality of die cuts 520. The die cuts 520 may comprise a generally rectangular, “open” shape, where an interior of each of the die cuts 520 is continuous with a greater area of the form 500. Like the form 100, the form 500 may provide for a more effective tamper evident form than conventional forms.

Figure 7:
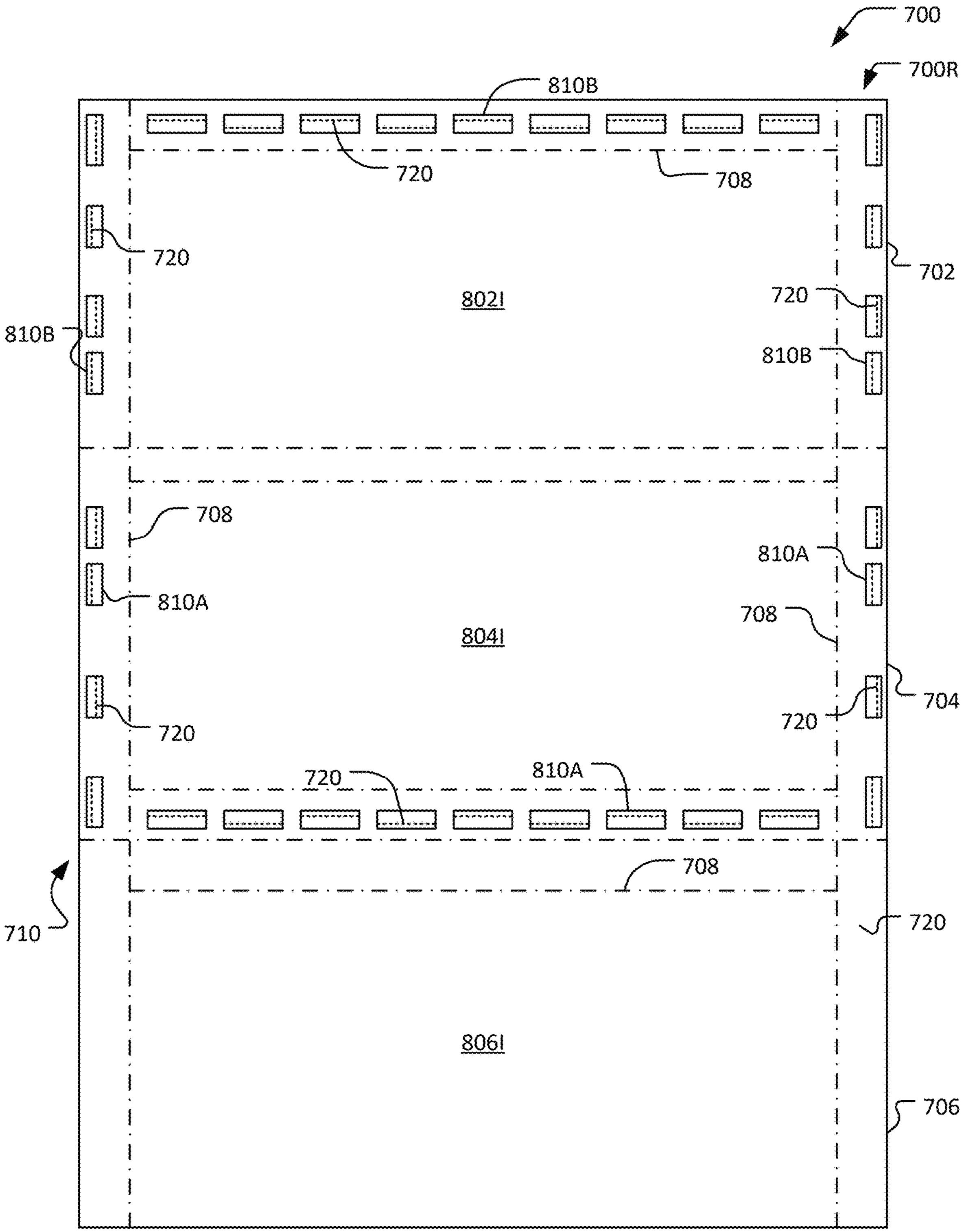
FIG. 7 shows a rear view of a form employing tamper evident features, in an unfolded configuration, according to still another embodiment of the disclosure.

FIG. 7 depicts a rear side 700R of an embodiment 700 of a tamper evident form that is substantially the same as the form 100, except where explicitly noted or would be implied. The parts similarly numbered may be the same for the embodiment 700 as for the embodiment 100, except that all part numbers that begin with 1______ may instead begin with 7______, and all part numbers that begin with 2______ may instead begin with 8______. One difference between the embodiment 700 and the embodiment 100 is that the embodiment 700 may have a different number and arrangement of the plurality of die cuts 720. The die cuts 720 may comprise a line of weakness on, around, and/or through the attachment features (e.g., attachment features 710). In embodiments, each of the attachment features may have a die cut 720 associated therewith. Like the form 100, the form 500 may provide for a more effective tamper evident form than conventional forms.

Figure 8:
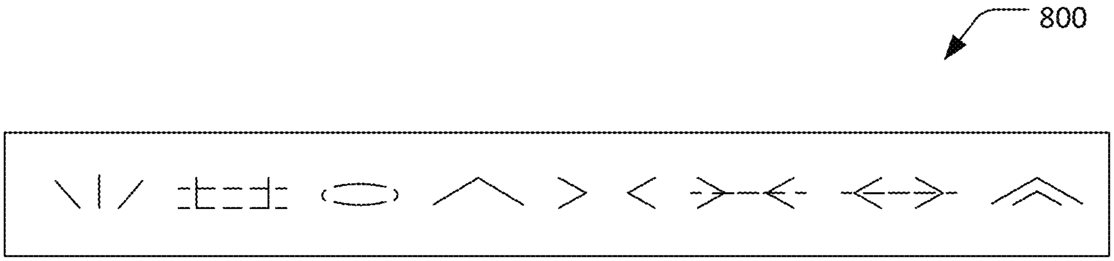
FIG. 8 shows a schematic view of a plurality of die cut patterns for use in the tamper evident features of various form embodiments.

FIG. 8 depicts a plurality of die cut shapes or patterns 800 that may be used alternately or additionally to the other die cut shapes described herein. The artisan would understand that the die cut shapes used in the tamper evident form embodiments described herein are non-limiting, and any suitable arrangement of die cut shapes described herein are contemplated and within the scope of the disclosure. The artisan would also understand that the tamper evident form embodiments described herein may be carried out using any suitable size and/or shape of form, such as an eleven inch form, a fourteen inch form, et cetera.

Thus, as has been described, the tamper evident form with pressure seal concepts disclosed herein may serve to provide for a more secure form which better indicates when a person has attempted to prematurely breach the form and view the contents therein. The forms 100, 300, 500, and 700 may further minimize the amount of die cuts needed (and the financial and time costs associated therewith) to provide for a more secure form. Whereas conventional forms generally rely on a high-pressure machine to press and seal together the various conventional form portions, the tamper evident form embodiments described herein may instead rely on a relatively low-pressure machine to achieve this function. In some embodiments, the forms 100, 300, 500. and/or 700 may be hand-pressed together into the folded configuration. Because low-pressure machines are generally less costly to maintain/produce than high-pressure machines, the tamper evident form embodiments described herein may reduce the overall operating costs normally associated with conventional forms, especially when the tamper evident form embodiments described herein are hand-pressed.

Figure 9:
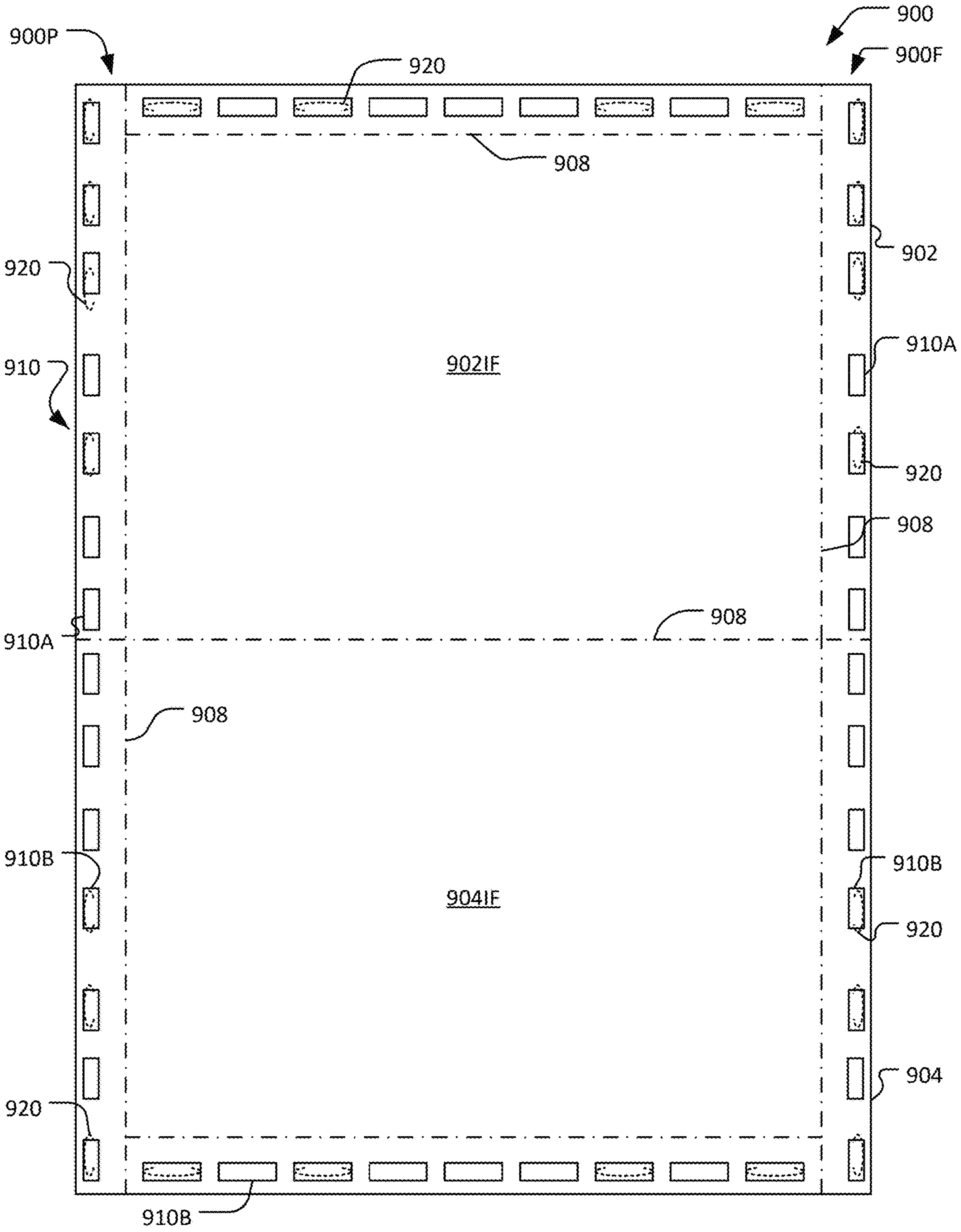
FIG. 9 shows a front view of a pressure seal form and label system, in an unfolded configuration, according to an embodiment of the disclosure.
Figure 10:
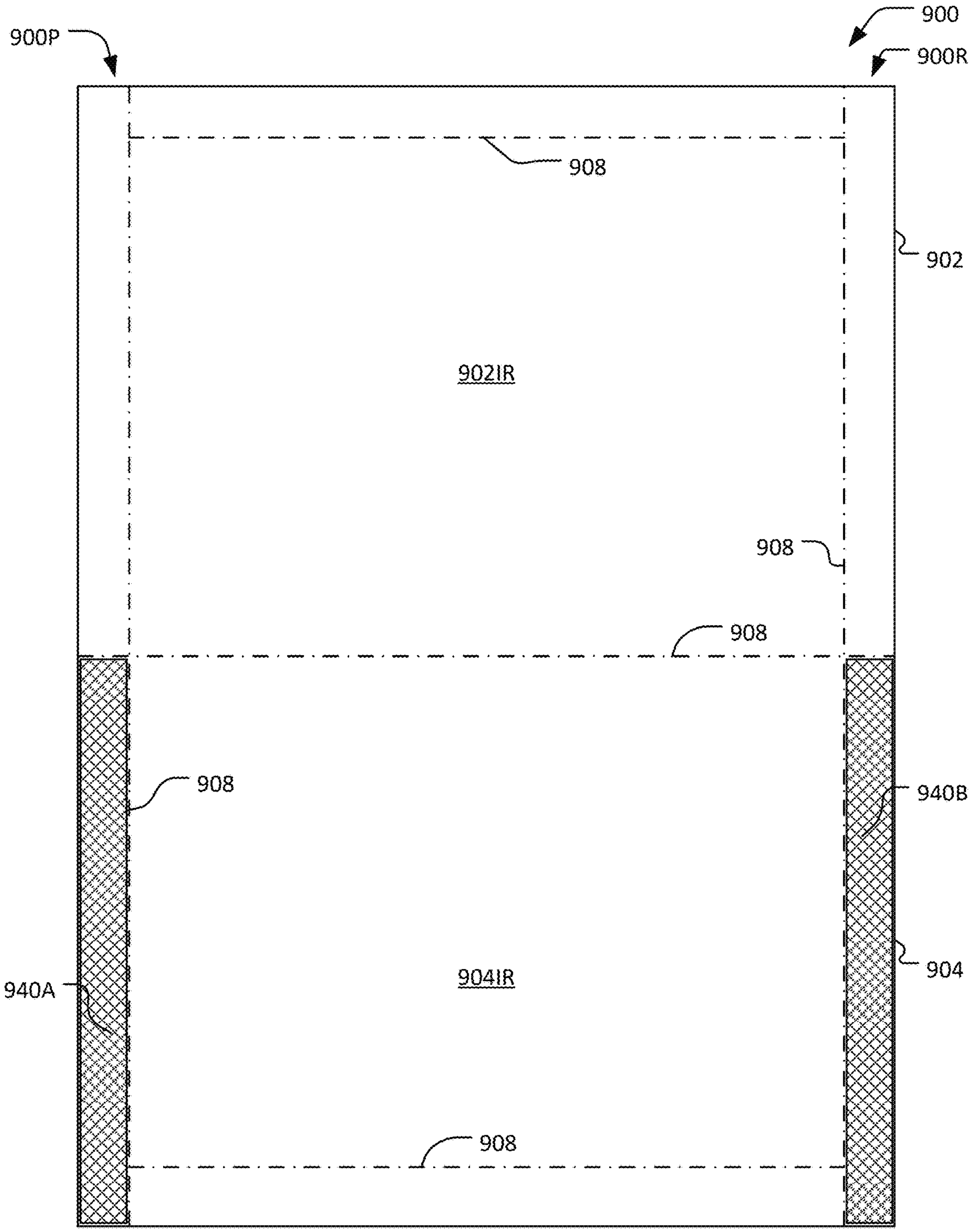
FIG. 10 shows a rear view of the pressure seal form and label system of FIG. 9, in the unfolded configuration.
Figure 11:
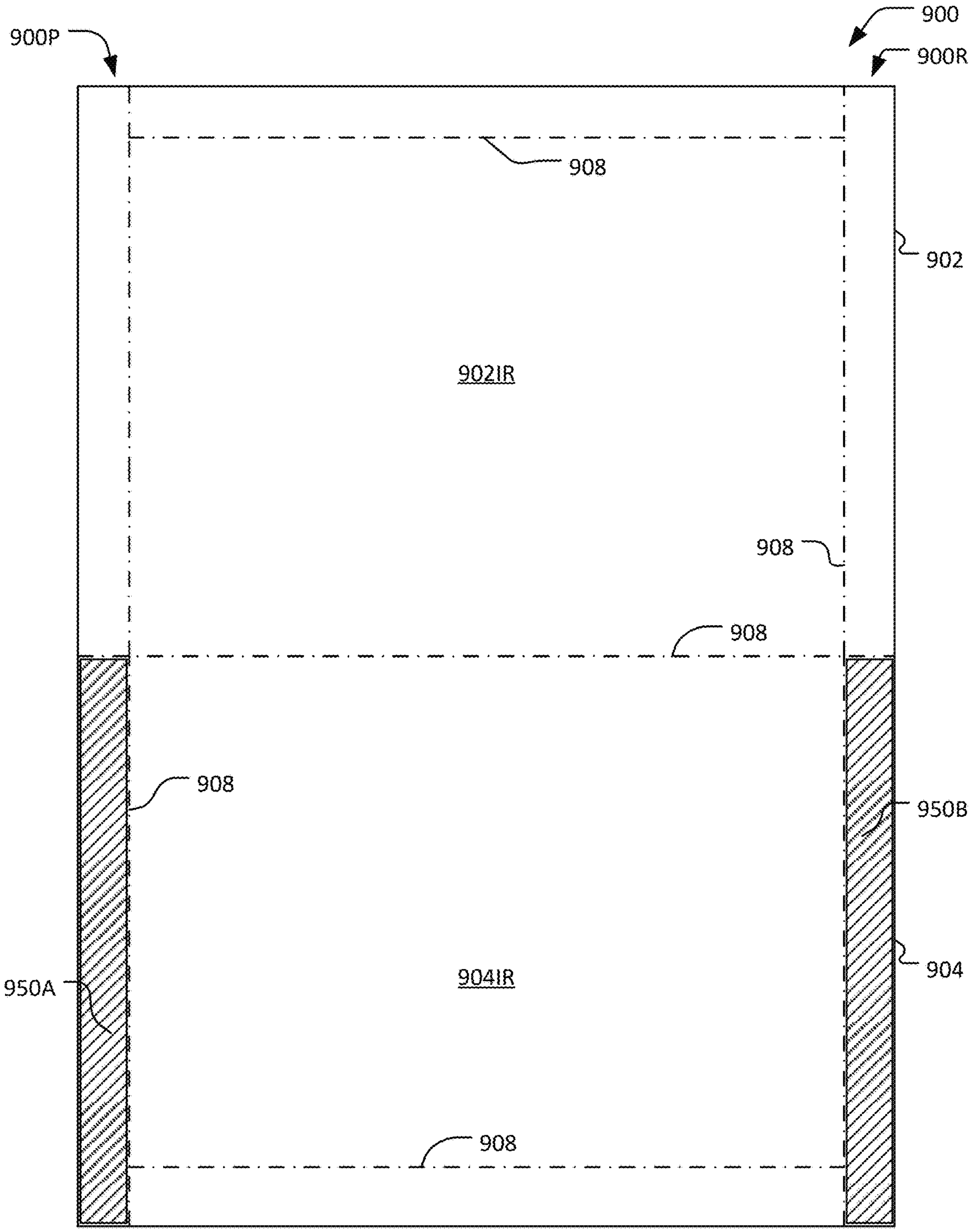
FIG. 11 shows another rear view of the pressure seal form and label system of FIG. 9, in the unfolded configuration.

FIGS. 9-11 depict an embodiment 900 of a pressure seal form and label system that is substantially the same as the form 100, except where explicitly noted or would be implied. The parts similarly numbered may be the same for the embodiment 900 as for the embodiment 100, except that all part numbers that begin with 1______ may instead begin with 9______. One difference is that the system 900 may have a first panel 902 and a second panel 904 in what is referred to herein as a “V-fold” configuration, where one of the panels 902 and 904 has strips of adhesive 950A and 950B (FIG. 11) and strips of liner material 940A and 940B (FIG. 10) that enable adherence of the system 900 to a surface or substrate, such as a package. In this manner, the pressure seal form (e.g., the tamper evident form) embodiments described herein may also function as a label. Another difference between the embodiment 900 and the embodiment 100 is that the embodiment 900 may have a different number and arrangement of the plurality of pressure seal attachment features 910. Like the form 100, the form 900 may, in some embodiments, provide for a more effective tamper evident form than conventional forms through a plurality of die cuts 920 arranged on or near the attachment features 910.

The system 900 may be constructed of any suitable material now known or subsequently developed, such as paper, card stock, plastic card, cardboard, polyester, et cetera. Information or indicia may be printed directly onto the system 900 (e.g., directly onto the system 900 and/or a printable coating thereof). Alternately or additionally, in embodiments, the system 900 may function as an envelope and retain therein separate contents or materials (e.g., a card, a sheet of paper, etc.) having information. The system 900 may comprise a first panel 902 and a second panel 904, lines of weakness or perforations 908, a plurality of attachment features 910, strips of adhesive 950A and 950B (FIG. 11), and strips of liner material 940A and 940B (FIG. 10). In embodiments, the system 900 may include a plurality of die cuts 920. The perforations 908 may define each of the panels 902 and 904 (e.g., a boundary thereof of each) as well as perimeter portions 900P. The perforations 908 may be exploited by a user to bend and/or tear away portions of the system 900. The attachment features 910 may be situated in the perimeter portions 900P in the system front side 900F and may be used to secure the system 900 in a folded configuration (e.g., folded in half). In embodiments where the system 900 comprises die cuts 920, the die cuts 920 may be used to indicate to the user if someone had attempted to access the hidden information of a folded system 900, as will be discussed in further detail below. Embodiments of the system 900 may include further security features, such as security indicia which may be any suitable pattern of indicia configured to mitigate the ability of a person to view (e.g., optically or with other imaging technology) the otherwise obscured contents of the system 900 when in the folded configuration (e.g., through one or more layers of the system 900). In embodiments, the system 900 may further compromise a window (e.g., window 935) (FIG. 20) that is an opening in one of the panels 902 or 904 that enables a portion or space of a panel 902 or 904 to be viewed through a thickness of one of the panel 902 and 904 when the system 900 is in the folded configuration.

As shown in the figures here, the system 900 may have a V-fold configuration, where the system 900 may be folded once (e.g., in half) in the folded configuration. However, the artisan understands that embodiments of the system 900 may instead be configured to be folded any number of suitable times, such as three times in a trifold configuration. The artisan would also understand that embodiments of the system 900 may be folded asymmetrically such that one of the first panel 902 and the second panel 904 is larger than the other. In such embodiments, when the system 900 is folded, the larger of the panels 902 or 904 may extend past the other of the panels 902 or 904. The portion of the panel 902 or 904 that extends past the other panel 902 or 904 may including scoring, and may act as a pull tab to facilitate user access to the contents of the folded system 900. This may be especially advantageous, for example, in system 900 embodiments that forego one or more perforations 908 along an end of the panels 902 and 904.

The plurality of attachment features 910 may be used to secure the panels 902 and 904 together when the system 900 is in the folded configuration. The attachment features 910 may comprise, for example, adhesive for fixedly securing the panels 902 and 904 together. In embodiments, the attachment features 910 may have a cohesive nature. That is to say, the attachment features 910 may be configured to fixedly secure (e.g., via a pressure sensitive adhesive) to other attachment features 910 when brought into contact and pressed together. Therefore, each of the attachment features 910 may be arranged on the panels 902 and 904 such that each feature 910 on a given panel 902 and 904 corresponds to another feature 910 on another panel 902 and 904 on the same side 900F when folded. On the front side 900F, this may mean that each of the attachment features 910A on the panel 902 may have a corresponding attachment feature 910B on the panel 904. In this way, the system 900 may be pressure sealed (e.g., fixedly secured) in the folded configuration. The attachment features 910 may reside exclusively within the perimeter portions 900P of the system 900.

In embodiments where the system 900 comprises die cuts 920, the die cuts 920 may be arranged on, at, and/or near the attachment features 910 (e.g., each overlapping a portion of the attachment features 910). In embodiments, and like the attachment features 910, each of the die cuts 920 may be arranged such that they correspond to (i.e., contact) another die cut 920 when the system 900 is in the folded configuration. In still more embodiments, each of the attachment features 910 may have die cuts associated therewith. In use, when a person attempts to dissociate attachment features 910 that are secured together, the die cuts 920 located at or near the affected attachments features may be configured to tear from the rest of the system 900, or to otherwise provide for a weakened area of the system 900 which may begin to tear, as described above.

Focusing on FIGS. 10 and 11, a rear side 900R of the system 900 is shown. FIG. 10 shows the system 900 where the strips of release material 940A and 940B are covering the strips of adhesive 950A and 950B, and FIG. 11 shows the system 900 where the strips of release material 940A and 940B are removed and the strips of adhesive 950A and 950B are exposed. The strips of adhesive 950A and 950B may be sized to fit within the perimeter portion 900P of only one panel 902 or 904, and may be bounded by perforations 908. The strips of release material 940A and 940B may be sized correspondingly to the strips of adhesive 950A and 950B. In the embodiment shown in FIGS. 10 and 11, the strips of release material 940A and 940B and the strips of adhesive 950A and 950B may extend along only half the length of the system 900 (e.g., only along the length of panel 904).

Figure 12:
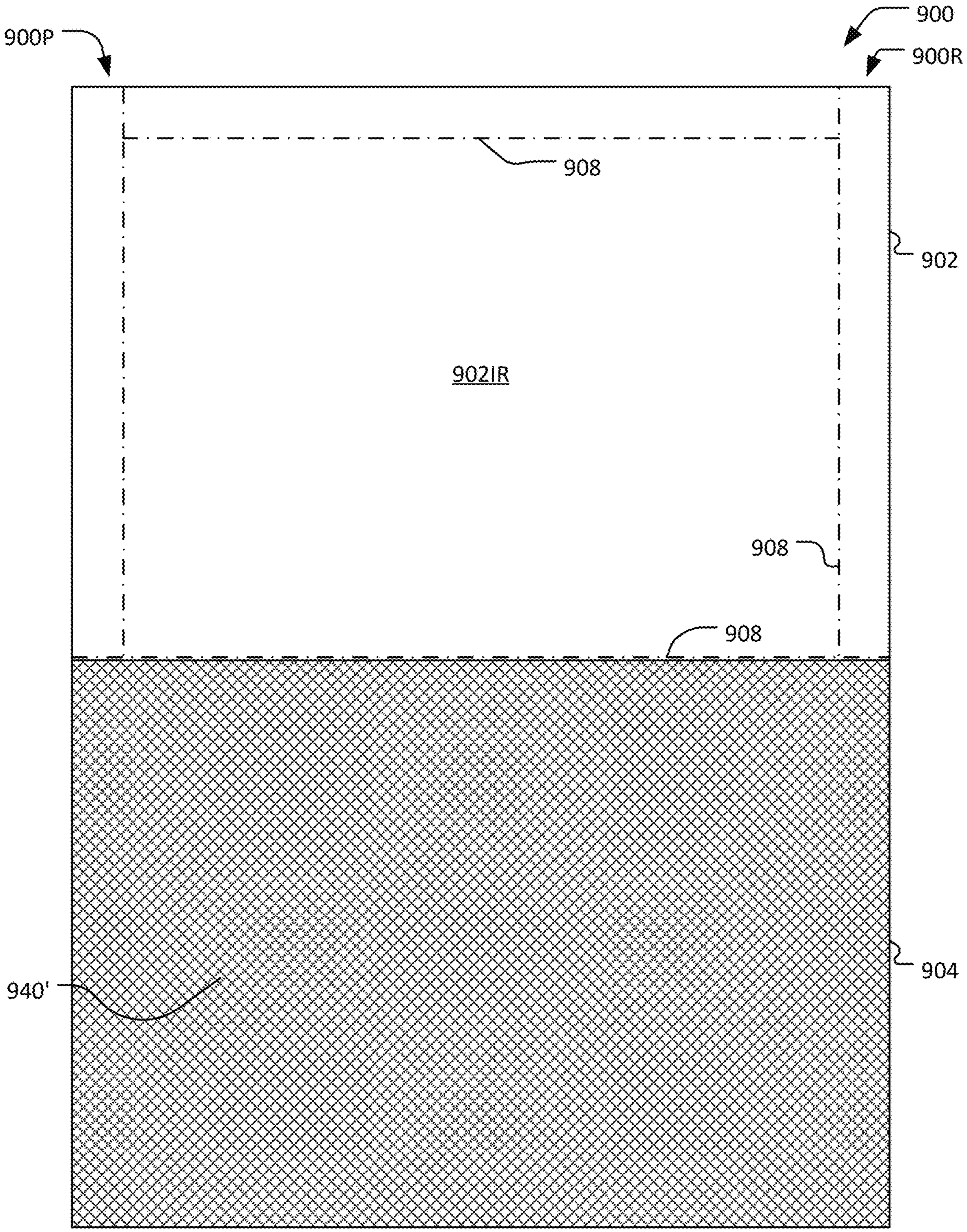
FIG. 12 shows a rear view of the pressure seal form and label system of FIG. 9, in the unfolded configuration, according to another embodiment of the disclosure.
Figure 13:
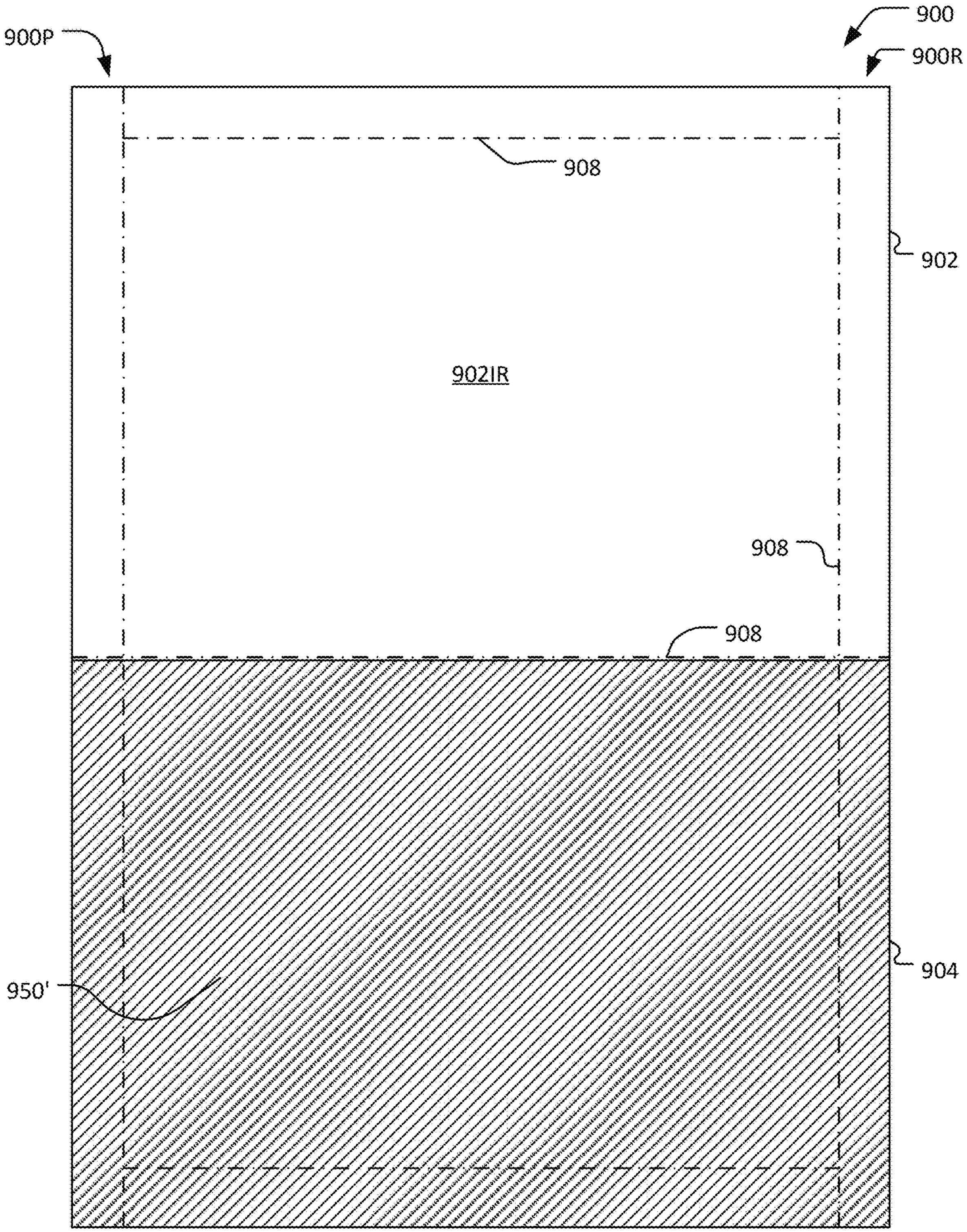
FIG. 13 shows another rear view of the pressure seal form and label system of FIG. 12, in the unfolded configuration.

Though the release material 940A and 940B and the adhesive 950A and 950B are depicted here in the drawings as being rectangular strips, other release material and/or adhesive shapes and sizes are contemplated herein (e.g., the adhesive 950A and/or 950B may be sized to cover an entirety or half of the rear side 900R of the panel 904, and the release material 940A and/or 940B may be sized correspondingly). An alternate embodiment of the system 900 is shown in FIGS. 12 and 13, which show a release layer or liner 940' (FIG. 12) and an adhesive layer 950' (FIG. 13) that covers (e.g., covers an entirety, covers a majority, etc.) of the panel 904. In such embodiments, the portions (e.g., all of the portions) of the system 900 that are intended to be adjacent a package during use (e.g., the rear side 900R of the panel 904) may have adhesive 950', and the release layer 940' may preclude the adhesive 950' from unduly adhering to substrates or debris. In embodiments, the system 900 may have a "linerless" configuration, where the adhesive strips 950A and 950B are located on one side of the system 900 (e.g., the system rear side 900R) and the strips of release material 940A and 940B are located on the opposing side of the system 900 (e.g., on the system front side 900F). Such a configuration may provide for a linerless system 900 whose release strips 940A and 940B may preclude undue adhesion of one system 900 to another system 900 when those system 900 are arranged together, for example, in a fan-fold stack or roll.

Figure 19A:
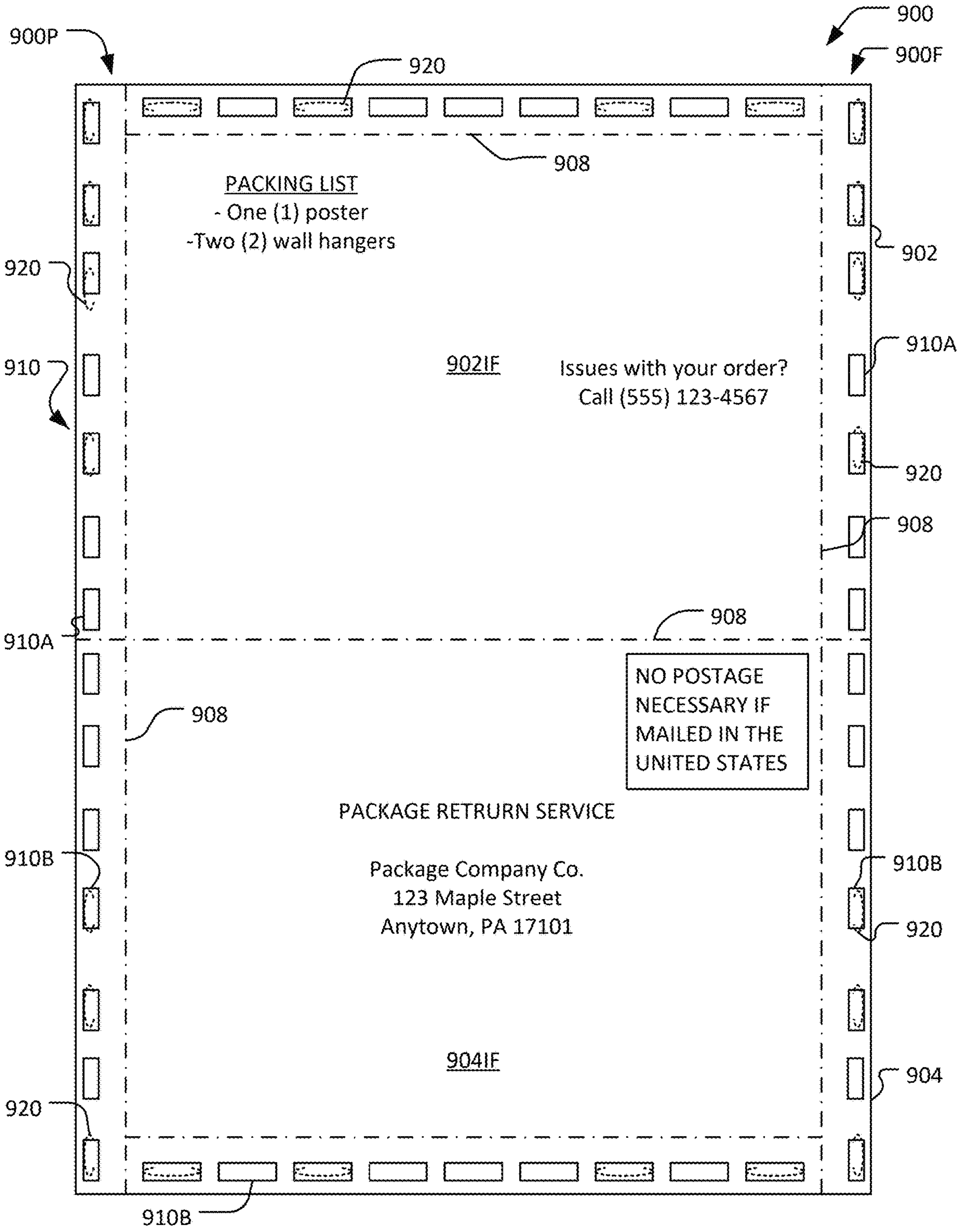
FIG. 19A a front view of the pressure seal form and label system of FIG. 9, in an unfolded configuration, having indicia printed thereon.
Figure 19B:
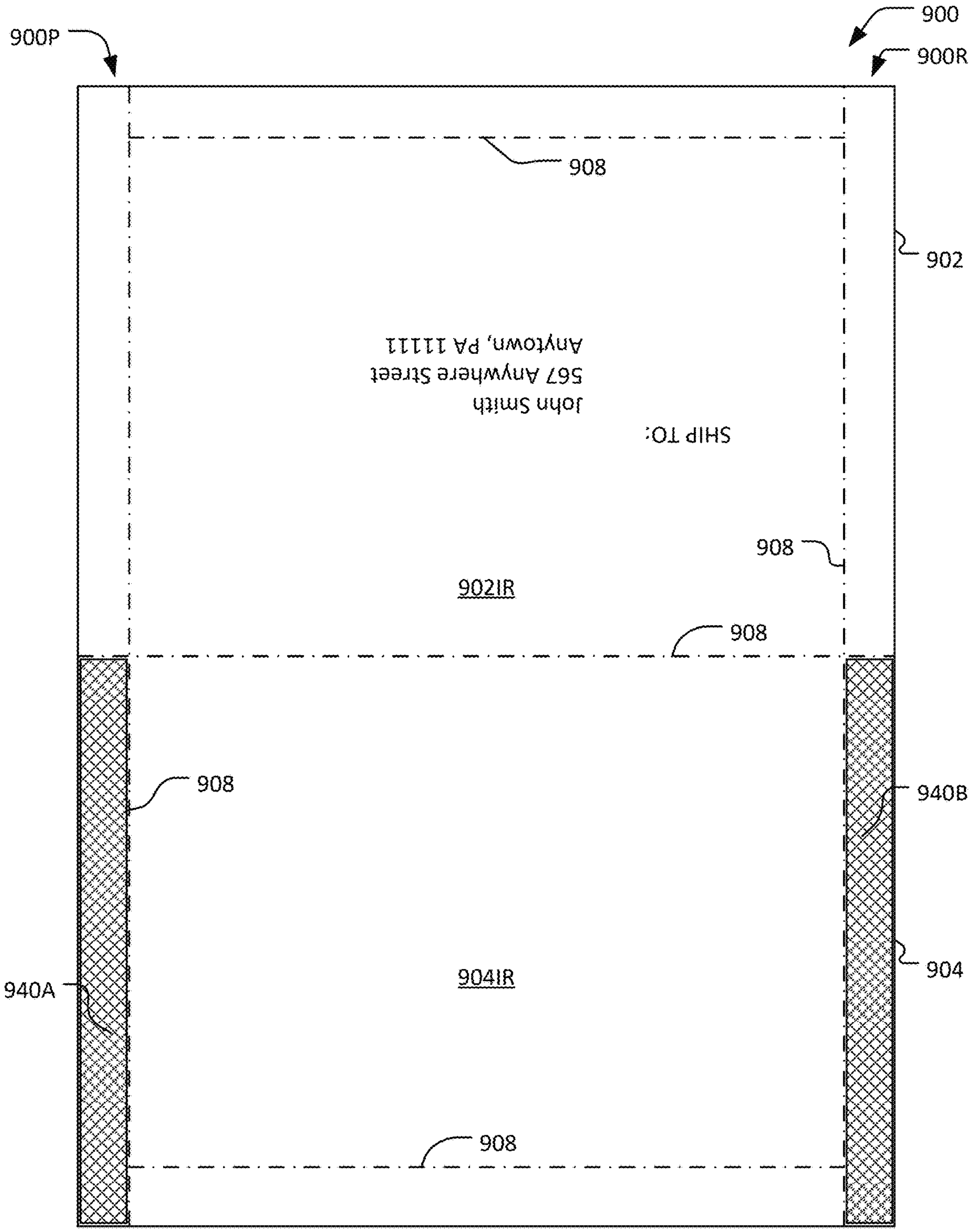
FIG. 19B is a rear view of the pressure seal form and label system of FIG. 9, in the unfolded configuration, having indicia printed thereon.
Figure 19C:
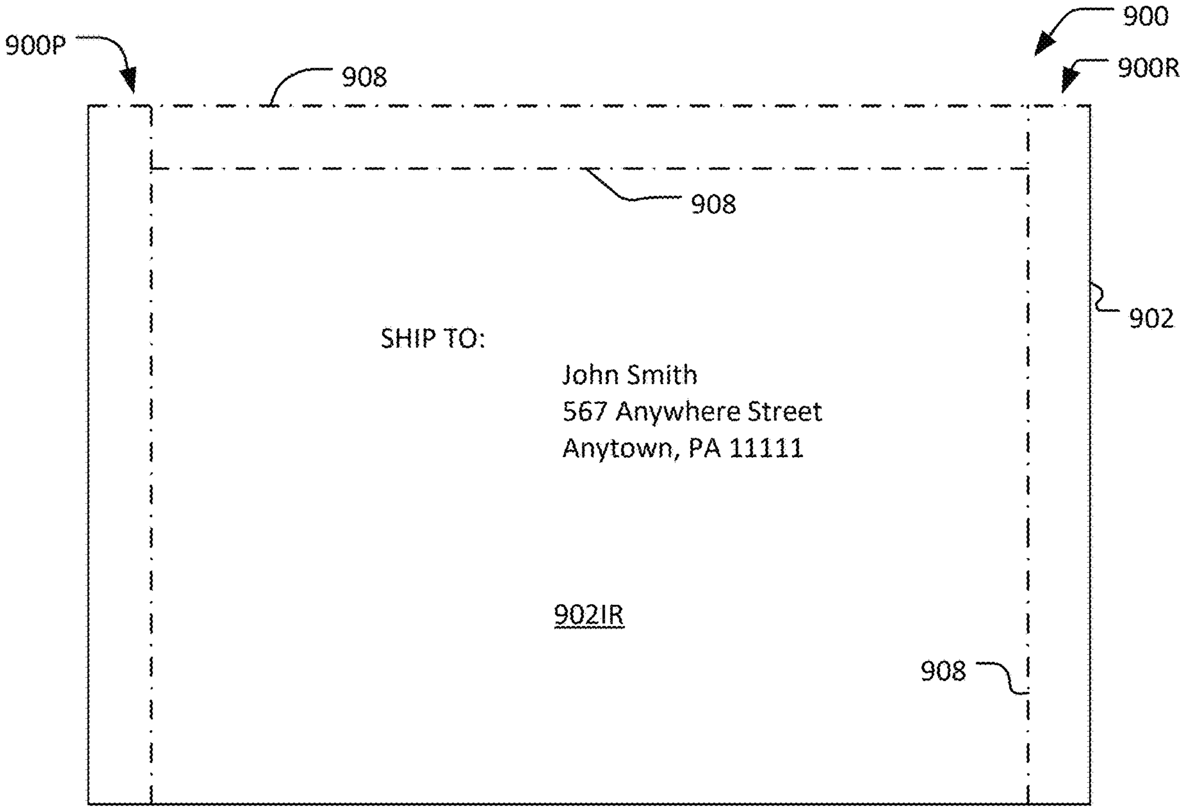
FIG. 19C is a front view of the pressure seal form and label system of FIG. 9, in a folded configuration, having indicia printed thereon.
Figure 19D:
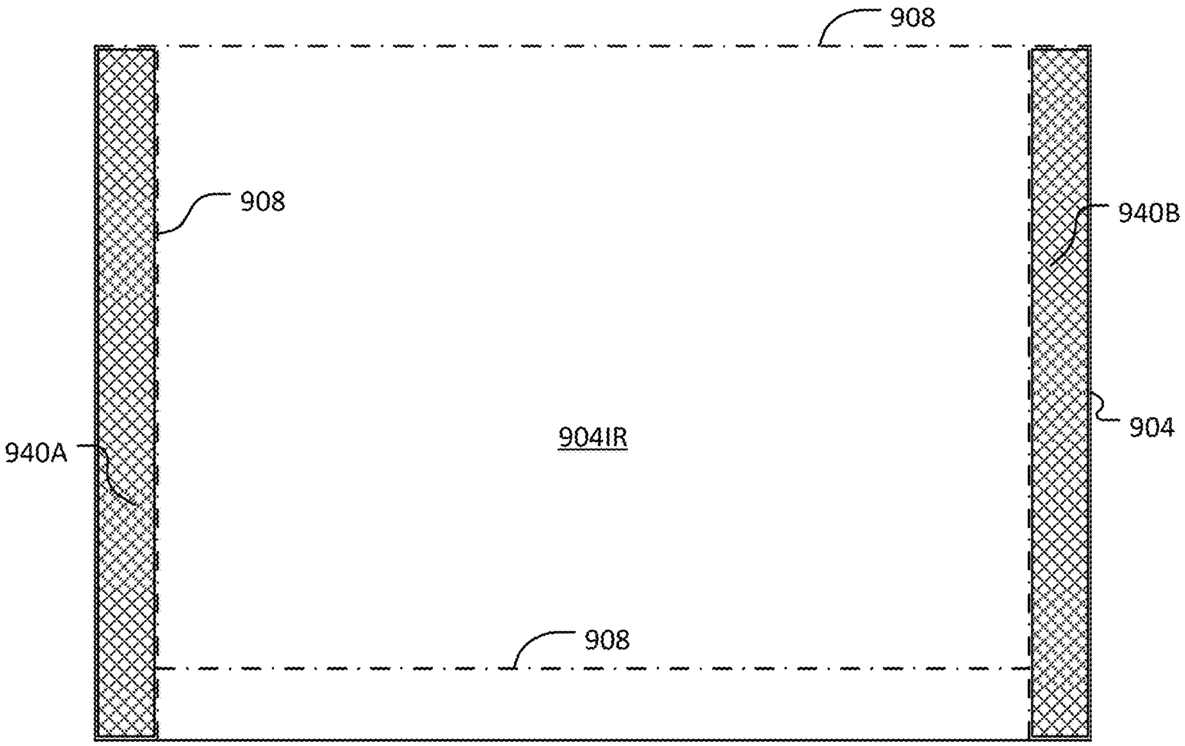
FIG. 19D is a rear view of the pressure seal form and label system of FIG. 9, in the folded configuration, having indicia printed thereon.

Focusing now on FIGS. 9 and 19A, showing the system front side 900F, and FIGS. 10 and 19B, showing the system rear side 900R, the system 900 may be configured to receive indicia (e.g., printed text, images, et cetera) on any or all of the panels 902 and 904. In embodiments, the first panel 902 may have a section 902IF that is configured to receive, for example, packing list indicia (FIG. 19A), and the second panel 904 may have a section 904IF containing marketing material indicia and/or return shipping information (FIG. 19A). When the system 900 is folded in half (e.g., when the section 902IF and 904IF and the pressure seal attachment features 910A and 910B thereof are brought together) (see FIGS. 19C and 19D), the indicia printed in the sections 902IF and 904IF may be hidden from view until a user exploits the perforations 908 and/or the attachment features 910 to unfold the system 900. Meanwhile, indicia printed on the system rear side 900R may be exposed for viewing while the system 900 is adhered to a package. For example, the section 902IR (FIG. 19B) may contain shipping information, marketing materials, and/or other indicia that advertises a company or product.

In embodiments that have a window, indicia printed in the window space in the section 904IF may be disparate from other indicia printed in the section 904IF, in that the indicia printed in the window space may be accessible for viewing through the window when the panels 902 and 904 are folded together. For example, indica printed in the window space may be marketing materials, the name of the recipient of the system 900 or of the package the system 900 is adhered to, et cetera.

On the system 900 rear side 900R, a section 902IR of the first panel 902 may likewise be configured to receive indicia, such as shipping information. When folded, indicia printed on the section 902IR of the system 900 may face outward and be accessible for viewing. (See FIG. 19C). In embodiments, section 904IR of the second panel 904 may be devoid of indicia. The system 900 may include one or more printable coatings configured to receive indicia of the desired type of printing (e.g., laser printing, inkjet printing, direct thermal printing, et cetera) in these sections 902IF, 904IF, 902IR, and/or 904IR.

An example way to fold and use the system 900 is as follows, and as shown in FIGS. 14A-14D. The user may bend the panel 902 along the perforations 908 downwards towards the panel 904 such that the attachment features 910A mate with the attachments features 910B on the system front side 900F, in the folded configuration. In embodiments, the attachment features 910 may be configured such that machinery or a specialized device (e.g., a pressure seal machine) is required to produce the amount of force needed to fixedly secure the attachment features 910 together. Attempting to seal the attachment features 910 without such a device (e.g., attempting by hand) may otherwise not provide enough force to cause the attachment features 910 to adhere. Only the rear side 900R of the panels 902 and 904 may be visible from the outside when the system 900 is folded. Note that the attachment features 910 may not be visible in the folded condition, and that the attachment features 910 may be sealed with a device or machine while the liner 940A and 940B is still secured to the system 900. (See also, FIGS. 19C and 19D).

Figure 14A:
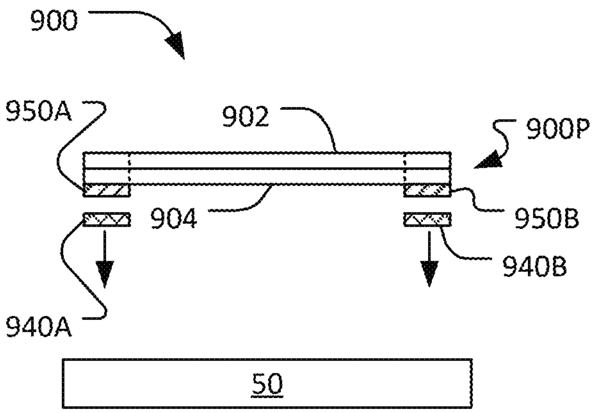
FIGS. 14A-14D are schematic representations of an example operation of the pressure seal form and label system of FIG. 9.
Figure 14B:
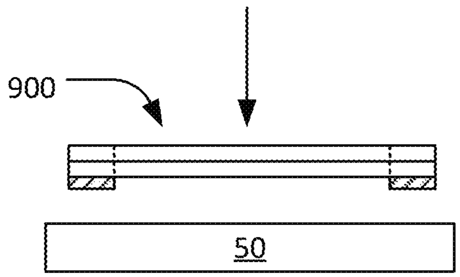
Figure 14C:
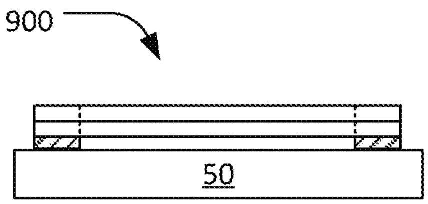
Figure 14D:
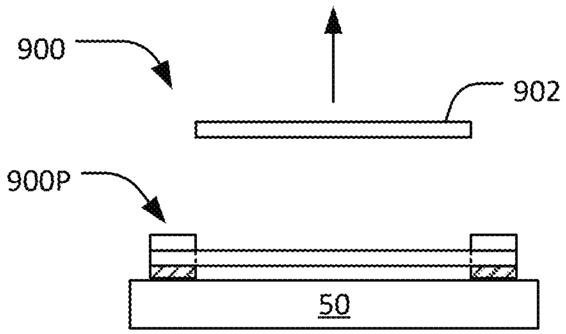
Figure 19E:
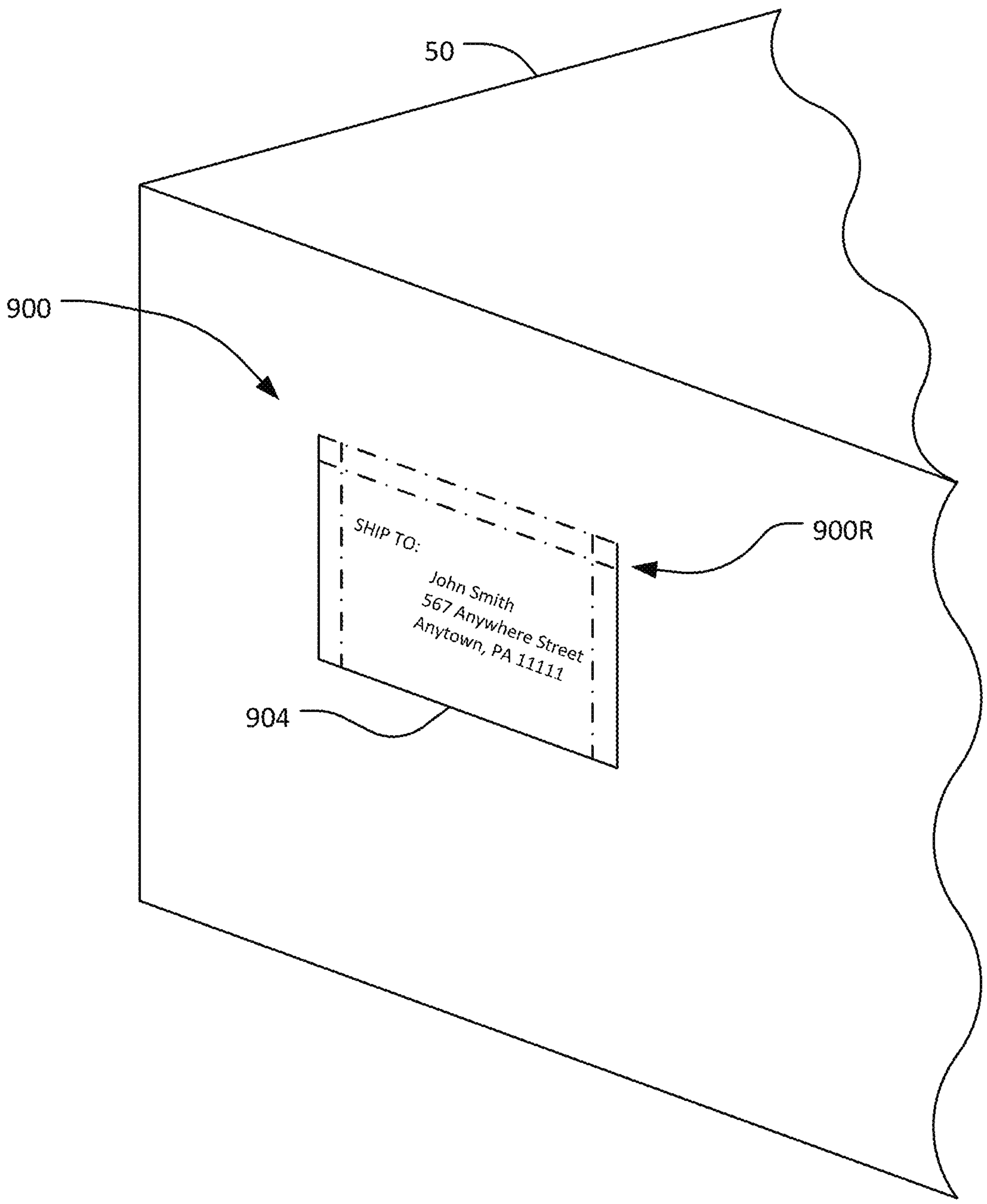
FIG. 19E is a perspective view of the pressure seal form and label system of FIG. 9, in the folded condition, adhered to a package.
Figure 19F:
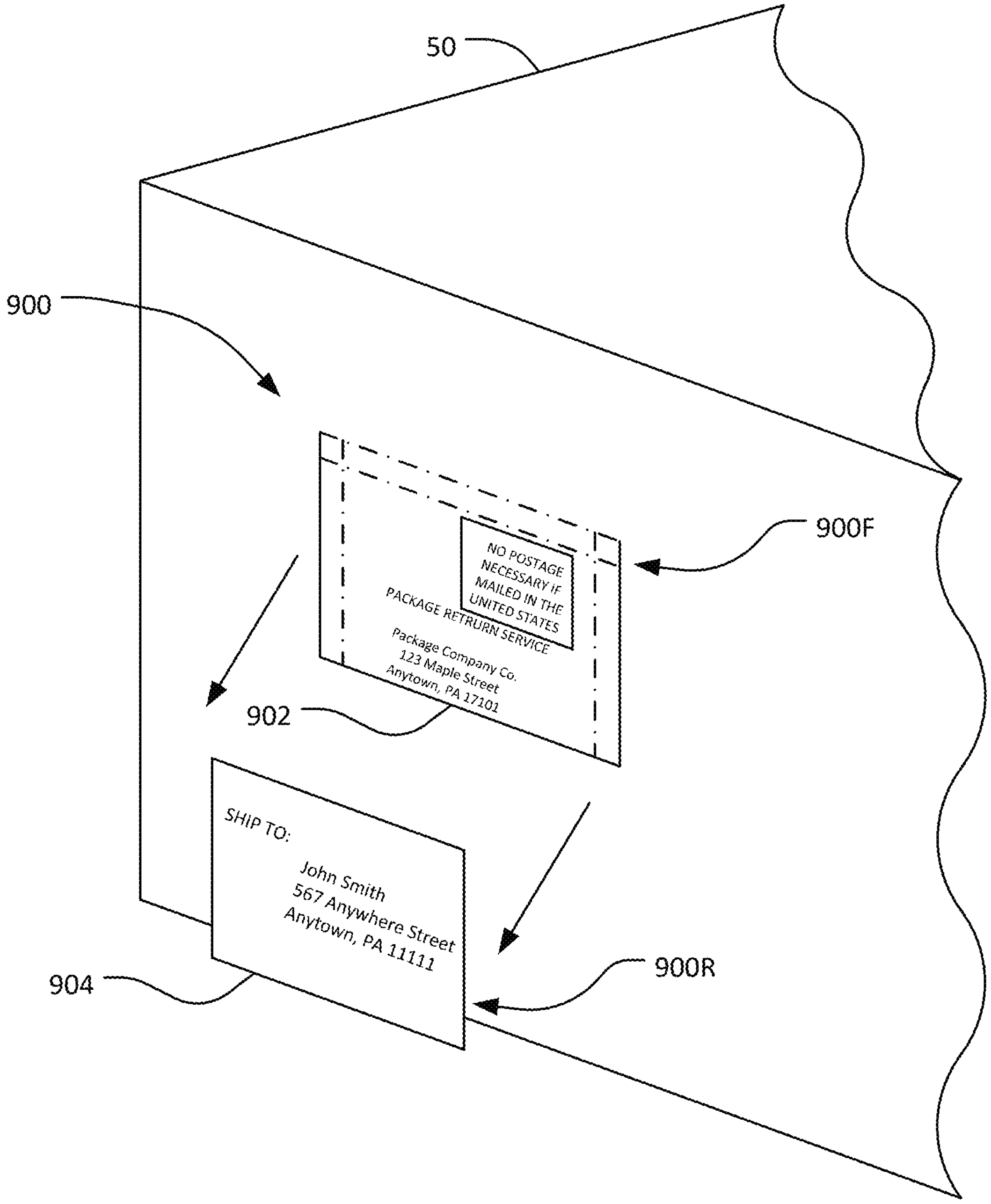
FIG. 19F is a perspective view of the pressure seal form and label system of FIG. 9, in the folded condition, with one panel being removed from another panel that is still adhered to the package.
Figure 20:
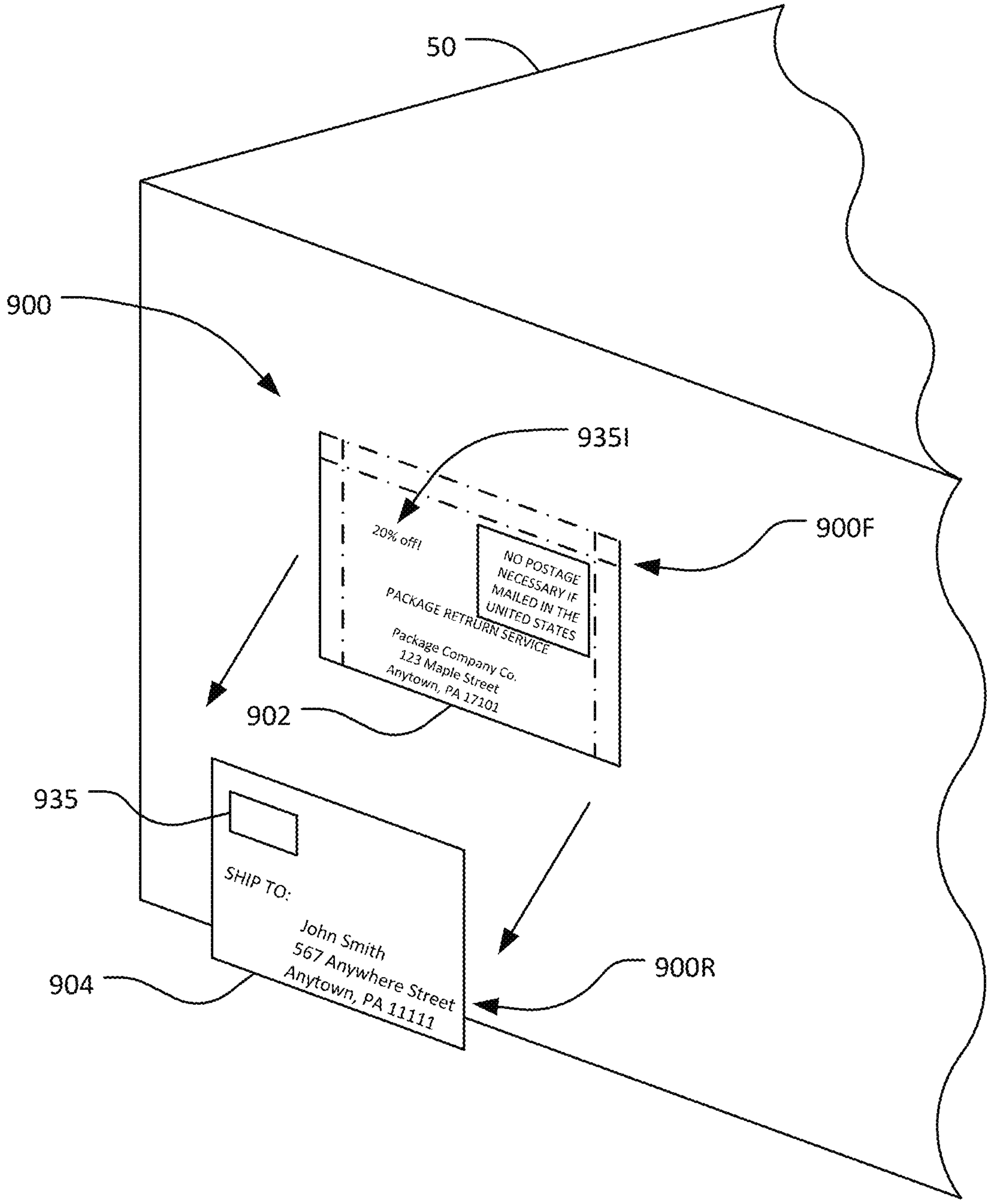
FIG. 20 is another perspective view of the pressure seal form and label system, in the folded condition, with one panel being removed from another panel that is still adhered to the package, according to an embodiment of the disclosure.

The strips of liner material 940A and 940B may be removed to expose the strips of adhesive 950A and 950B (FIG. 14A), and the system 900 may then be adhered to a surface or substrate (e.g., a package 50) via the now exposed strips of adhesive 950A and 950B (FIGS. 14B, 14C, and 19E). Afterwards, the end recipient may dissociate the perimeter portions 900P from the one or more of the panels 902 and/or 904 along the perforations 908 to unfold the system 900 and access the information hidden therein (e.g., the information printed therein and/or provided on separate material). In embodiments, the system 900 may include one or more tear strips and/or pull tabs to facilitate user access to the perforations 908. In some embodiments, the panel 902 may be removed from the rest of the system 900 (FIGS. 14D and 19F), and the panel 904 may be left behind still adhered to the surface or substrate. This may be advantageous in situations where, for example, the panel 904 contains return label information. Such embodiments may allow the user to not have to use another return label to provide return shipping information on the substrate 50. In some embodiments, and as shown in FIG. 20, the system 900 may contain an aperture or window 935 in the panel 904 to allow a portion 9351 of the panel 902 to be exposed for viewing while the system 900 is in the folded condition. In some embodiments, the portion 935I contains, for example, marketing materials or other information.

Figure 15:
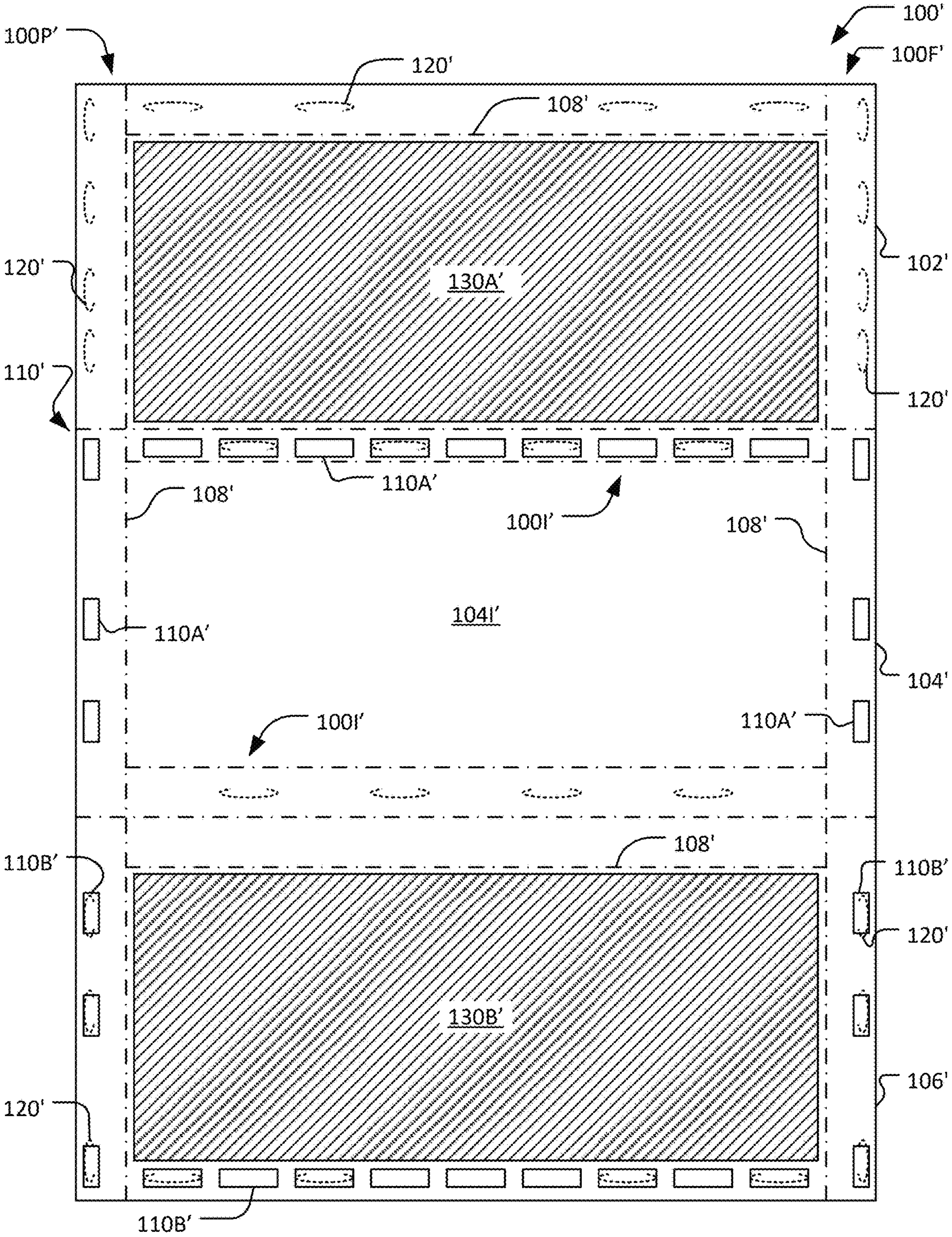
FIG. 15 shows a front view of a pressure seal form and label system, in an unfolded configuration, according to another embodiment of the disclosure.
Figure 16:
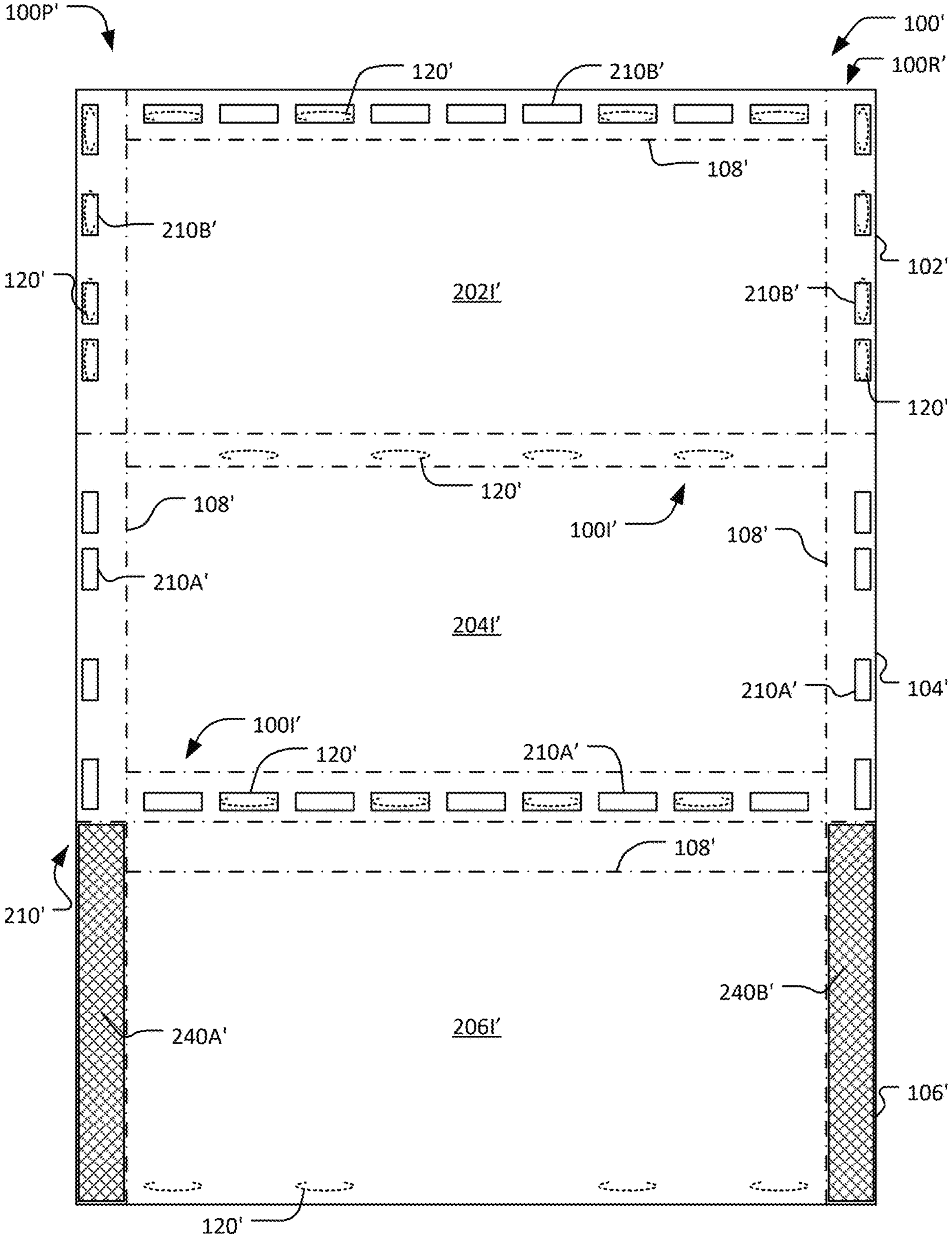
FIG. 16 shows a rear view of the pressure seal form and label system of FIG. 13, in the unfolded configuration.
Figure 17:
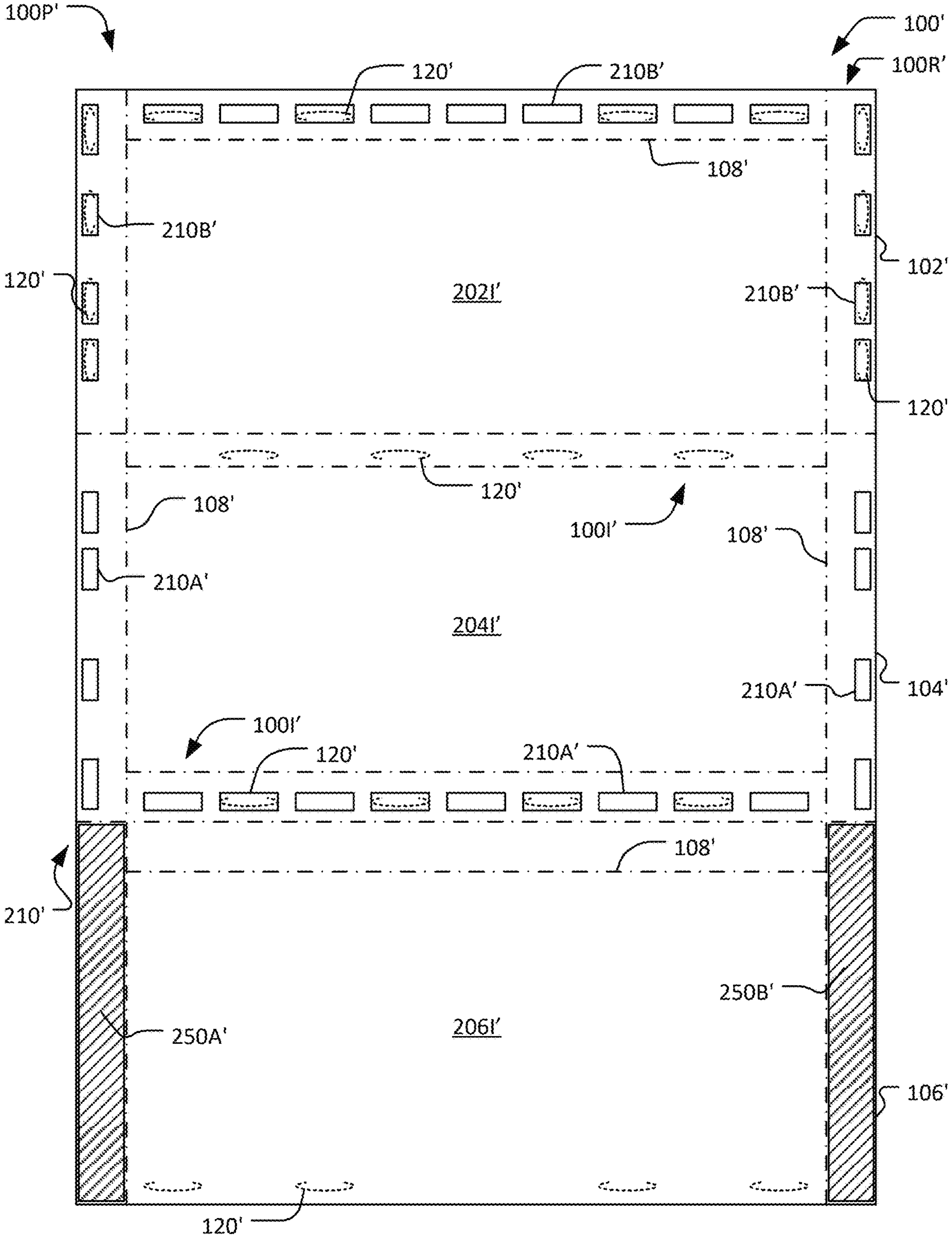
FIG. 17 shows another rear view of the pressure seal form and label system of FIG. 13, in the unfolded configuration.

FIGS. 15-17 depict an embodiment 100' of a pressure seal form and label system that is substantially the same as the form 100, except where explicitly noted or would be implied. The parts similarly numbered may be the same for the embodiment 100' as for the embodiment 100, except that all parts that are numbered 1______ may instead be numbered 1______', and all parts that are numbered 2______ may instead be numbered 2______'. One difference between the embodiment 100' and the embodiment 100 is that the embodiment 100' may include strips of release material or liner 240A' and 240B' (FIG. 16) and strips of adhesive 250A' and 250B' (FIG. 17) along the length of one of panels 102', 104', or 106'. In embodiments, and like the form 100, the form 100' may provide for a more effective tamper evident form than conventional forms.

Figure 18A:
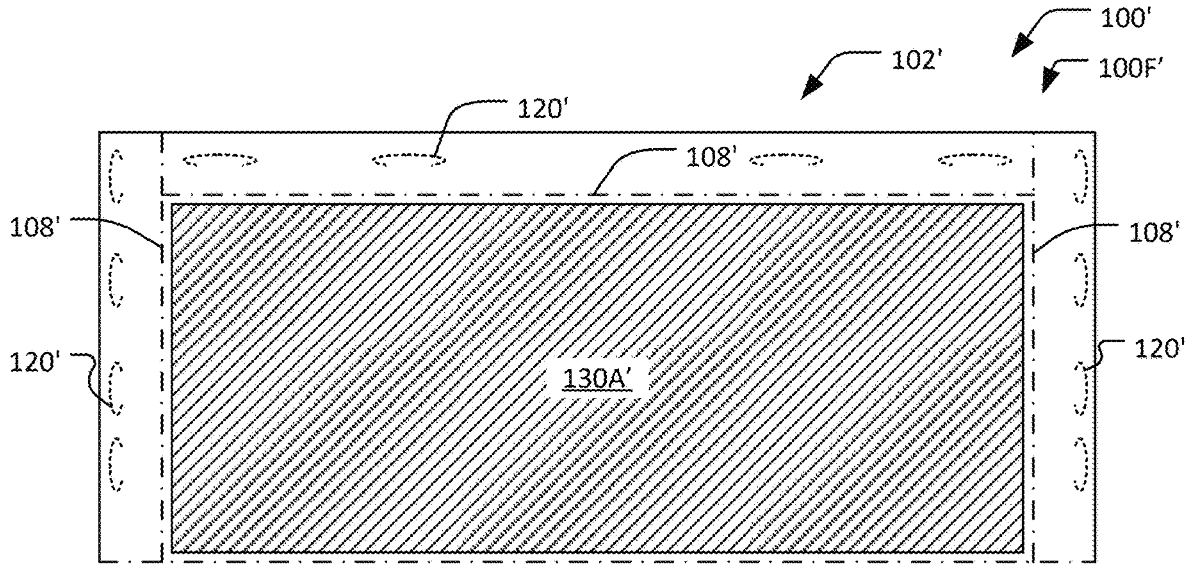
FIG. 18A shows a front view of the pressure seal form and label system of FIG. 13, in a folded configuration.
Figure 18B:
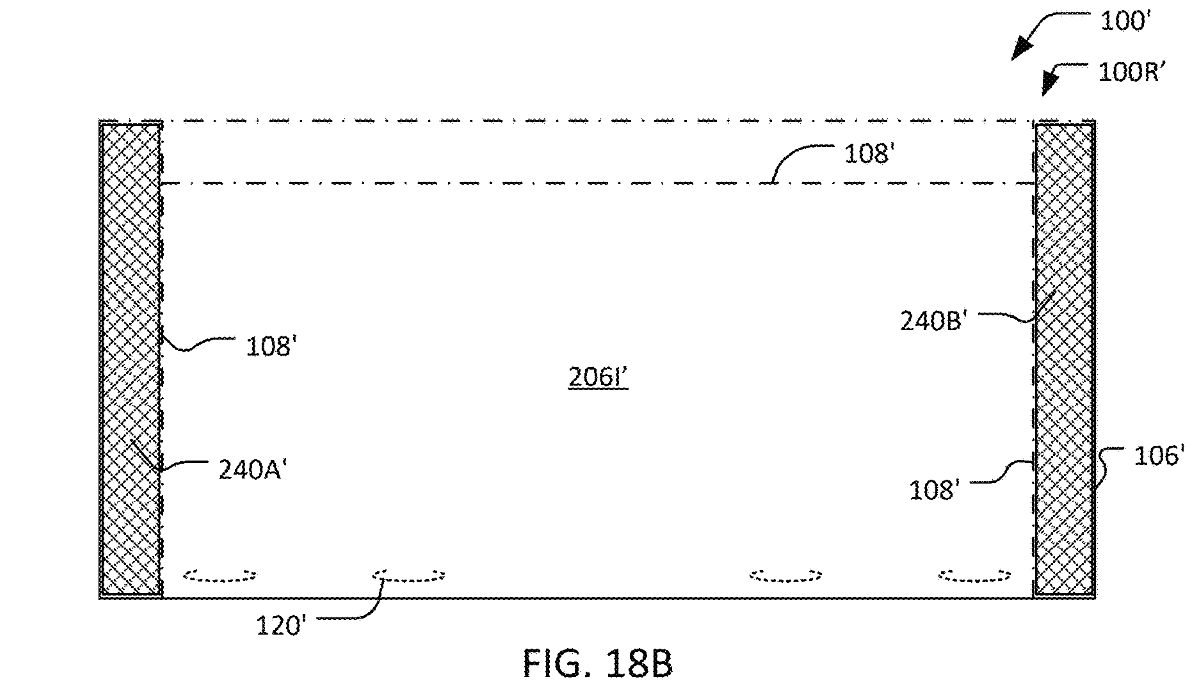
FIG. 18B shows a rear view of the pressure seal form and label system of FIG. 13, in the folded configuration.

FIGS. 15 and 16 depict the system 100', in an unfolded configuration. FIGS. 18A and 18B depict the system 100' in a folded configuration. The system 100' may be constructed of any suitable material now known or subsequently developed, such as paper, card stock, synthetic paper, polyester, et cetera. The information that is intended to be protected may be printed directly onto the system 100'. Alternately or additionally, in embodiments, the system 100' may function as an envelope and retain therein separate contents or materials (e.g., a card, a sheet of paper, etc.) having information. The system 100' may comprise a first panel 102', a second panel 104', a third panel 106', lines of weakness or perforations 108', a plurality of attachment features 110' and 210' (FIG. 16), strips of release material 240A' and 240B' (FIG. 16), and strips of adhesive 250A' and 250B' (FIG. 17). In embodiments, the system 900 may further comprise die cuts 120'. In still more embodiments, like the system 900, the system 100' may comprise a window or opening in one or more of the panels 102', 104', and/or 106'. The perforations 108' may define each of the panels 102', 104', and 106', (e.g., a boundary thereof of each) as well as perimeter portions 100P' and intermediate portions 100I'. The perforations 108' may be exploited by a user to bend and/or tear away portions of the system 100'. The attachment features 110' and 210' may be used to secure the system 100' in the folded configuration. In embodiments where the die cuts 120' are present, the die cuts 120' may be used to indicate to the user if someone had attempted to access the information of a folded system 100', as discussed above. Embodiments of the system 100' may include further security features, such as security indicia 130A' and 130B' covering a portion of the panels 102', 104', and/or 106'.

As shown in the figures here, the system 100' may have a trifold or a "Z-fold" configuration, where the system 100' may be folded twice in the folded configuration. However, the artisan understands that embodiments of the system 100' may instead be configured to be folded any number of suitable times, such as just once in a bifold configuration.

Focusing now on FIG. 15, showing a system front side 100F', the system 100' may be configured to receive indicia (e.g., printed text, images, et cetera) on any or all of the panels 102', 104', and 106'. For example, the system 100' may have a section 1041' that is configured to receive printed indicia through a printable coating. The indicia printed may include sensitive information that is intended for a particular recipient of the system 100'. For example, the indicia may be personal or private information which is intended only to be viewed by a particular person. The system 100' may include one or more printable coatings configured to receive indicia of the desired type of printing (e.g., laser printing, inkjet printing, direct thermal printing, et cetera. Likewise, the panels 102', 104', 106' may have indicia printed alternately or additionally on a rear side 100R' thereof (FIG. 16) (e.g., in the sections 202I', 204I', and/or 206I').

In some embodiments, one or more of the panels 102', 104', or 106' may have security indicia (e.g., security indicia 130A' and 130B') printed thereon. The security indicia 130A' and 130B' may be any suitable pattern of indicia configured to mitigate the ability of a person to view (e.g., optically or with other imaging technology) the otherwise obscured contents of the system 100' when in the folded configuration (e.g., through one or more layers of the system 100').

The attachment features 110' and 210' may be used to secure the panels 102', 104', and 106' together when the system 100' is in the folded configuration. The attachment features 110' and 210' may comprise, for example, adhesive for fixedly securing the panels 102', 104', 106' together. In embodiments, the attachment features 110' and 210' may have a cohesive nature. That is to say, the attachment features 110' and 210' may be configured to fixedly secure (e.g., via a pressure sensitive adhesive) to other attachment features 110' and 210' when brought into contact and pressed together. Therefore, each of the attachment features 110' and 210' may be arranged on the panels 102', 104', and 106' such that each feature 110' and 210' on a given panel 102', 104', and 106' corresponds to another feature 110' and 210' on another panel 102', 104', and 106' on the same side 100F' and/or 100R' when folded. On the front side 100F', this may mean that each of the attachment features 110A' on the panel 104' may have a corresponding attachment feature 110B' on the panel 106'. For the system 100' rear side 100R' (FIG. 16), this may mean that each of the attachment features 210A' on the panel 104' may have a corresponding attachment feature 210B' on the panel 102'. In this way, the system 100' may be pressure sealed (e.g., fixedly secured) in the folded configuration (FIGS. 18A and 18B). The attachment features 110' and 210' may reside exclusively within the perimeter portions 100P' and intermediate portions 100I' of the system 100'.

Focusing on FIGS. 16 and 17, a rear side 100R' of the system 100' is shown. FIG. 16 shows the system 100' where the strips of release material or liner 240A' and 240B' are covering the strips of adhesive 250A' and 250B', and FIG. 17 shows the system 100' where the strips of release material 240A' and 240B' are removed and the strips of adhesive 250A' and 250B' are exposed. The strips of adhesive 250A' and 250B' may be sized to fit within the perimeter portion 100P' of only one panel 102', 104', or 106', and may be bounded by perforations 108'. The strips of release material 240A' and 240B' may be sized correspondingly to the strips of adhesive 250A' and 250B'. In the embodiment shown in FIGS. 16 and 17, the strips of release material 240A' and 240B' and the strips of adhesive 250A' and 250B' may extend along only a third of the length of the system 100' (e.g., only along the length of panel 106'). Though the release material 240A' and 240B' and the adhesive 250A' and 250B' are depicted here in the drawings as being rectangular strips, other release material and/or adhesive shapes and sizes are contemplated herein. For example, in embodiments, the adhesive 250A' and/or 250B' may be sized to cover an entirety of the rear side 100R' of the panel 106', and the release material or liner 240A' and/or 240B' may be sized correspondingly, as discussed above with respect to release material 940' and adhesive 950'.

In embodiments of the system 100' that include die cuts 120', the die cuts 120' may be arranged on, at, and/or near the attachment features 110' and 210' (e.g., each overlapping a portion of the attachment features 110' and 210'). In embodiments, and like the attachment features 110' and 210', each of the die cuts 120' may be arranged such that they correspond to (i.e., contact) another die cut 120' when the form 100' is in the folded configuration. In still more embodiments, each of the attachment features 110' and 210' may have die cuts associated therewith. In use, when a person attempts to dissociate attachment features 110' and/or 210' that are secured together, the die cuts 120' located at or near the affected attachments features may be configured to tear from the rest of the system 100', or to otherwise provide for a weakened area of the system 100' which may begin to tear. In this way, when a person attempts to separate the folded together panels 102', 104', and/or 106' from each other, the die cuts 120' may dissociate from or provide tears in the form 100'. This may readily provide visual evidence that a system 100' has been tampered with.

An example way to fold and use the system 100' is as follows. The user may bend the panel 106' along the perforations 108' upwards towards the panel 104' such that the attachment features 110B' mate with the attachments features 110A' on the system front side 100F'. Then, the user may bend the panel 102' along the perforations 108' downwards towards the panel 104' such that the attachment features 210B' mate with the attachments features 210A' on the form rear side 100R'. In embodiments, the attachment features 110' and 210' may be configured such that machinery or a specialized device (e.g., a pressure seal machine) is required to produce the amount of force needed to fixedly secure the attachment features 110' and 210' together. Attempting to seal the attachment features 110' and 210' without such a device (e.g., attempting by hand) may otherwise not provide enough force to cause the attachment features 110' and 210' to adhere. Only the front side 100F' of the panel 102' (FIG. 18A) and the rear side 100R' of the panel 106' (FIG. 18B) may be visible from the outside when the system 100' is folded. Note that the attachment features 110' and 210' may not be visible in the folded condition, and that the attachment features 110' and 210' may be sealed with a device or machine while the liner 240A' and 240B' is still secured to the system 100'. In some examples, a machine may be employed to fold and seal all or part of the system 100'.

The panel 104' may be sandwiched between the panel 102' and 106', and both sides 100F' and 100R' of the panel 104' may be hidden. The strips of liner material 240A' and 240B' may be removed to expose the strips of adhesive 250A' and 250B', and the system 100' may then be adhered to a surface or substrate (e.g., a package 50) via the now exposed strips of adhesive 250A' and 250B', as discussed above with respect to embodiment 900. Afterwards, the end recipient may dissociate the perimeter portions 100P' from the form 100' using the perforations 108' to unfold the form 100' and access the information hidden therein (e.g., the information printed therein and/or provided on separate material). In embodiments, the system 100' may include one or more tear strips and/or pull tabs to facilitate user access to the perforations 108'. In some embodiments, one or more of the panels 102' and/or 104' may be removed from the rest of the system 100', and the panel 106' may be left behind still adhered to the surface or substrate. This may be advantageous in situations where, for example, the panel 106' contains return label information. Such embodiments may allow the user to not have to use another return label to provide return shipping information on the substrate 50.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and sub-combinations are of utility and may be employed without reference to other features and sub-combinations.

The invention claimed is:

1. A tamper evident form, comprising:
- a first panel;
- a second panel;
- a third panel;
- a first intermediate portion arranged between said second panel and said first panel;
- a second intermediate portion arranged between said second panel and said third panel;
- a perimeter portion arranged outboard each of said first panel, said second panel, and said third panel;
- a first set of attachment features located within said perimeter portion and said first intermediate portion, said first set of attachment features being adjacent said first panel;
- a second set of attachment features located within said perimeter portion and said second intermediate portion, said second set of attachment features being adjacent said second panel;
- an adhesive strip arranged in said perimeter portion;
- a removable release material strip arranged in said perimeter portion over said adhesive strip; and
- a first set of die cuts arranged overlappingly on said first set of attachment features;
- wherein, said first set of attachment features is configured to secure to said second set of attachment features.

2. The tamper evident form of claim 1, wherein said first set of attachment features and said second set of attachment features are cohesive.

3. The tamper evident form of claim 1, wherein said first set of attachment features is exclusively located within said perimeter portion and said first intermediate portion, and said second set of attachment features is exclusively located within said perimeter portion and said second intermediate portion.

4. The tamper evident form of claim 1, further comprising:
- a third set of attachment features located within said perimeter portion and said second intermediate portion, said third set of attachment features being adjacent said third panel; and
- a fourth set of attachment features located within said perimeter portion and said second intermediate portion, said fourth set of attachment features being adjacent said second panel.

5. The tamper evident form of claim 4, wherein said first set of attachment features and said second set of attachment features reside on a first side of said tamper evident form, and said third set of attachment features and said fourth set of attachment features reside on a second side of said tamper evident form.

6. The tamper evident form of claim 1, wherein each of said first set of die cuts has a generally semi-ovular shape.

7. The tamper evident form of claim 6, wherein each of said first set of die cuts has an open shape.

8. The tamper evident form of claim 1, wherein said tamper evident form comprises paper.

9. The tamper evident form of claim 1, wherein said first panel comprises security indicia.

10. The tamper evident form of claim 1, wherein each of said first panel, said second panel, and said third panel is configured to be printable.

11. The tamper evident form of claim 1, wherein each of said first panel and said third panel are configured to be foldable against said second panel.

12. The tamper evident form of claim 1, wherein each of said adhesive strip and said removable release material strip is arranged in said perimeter portion adjacent said third panel.

13. The tamper evident form of claim 1, wherein each of said adhesive strip and said removable release material strip is arranged over an entirety of a side of said third panel.

14. The tamper evident form of claim 1, further comprising a second set of die cuts arranged overlappingly on said second set of attachment features.

15. A tamper evident form, comprising:
- a first panel;
- a second panel;
- a first set of attachment features located adjacent said first panel on a form first side;
- a second set of attachment features located adjacent said second panel on said form first side;
- an adhesive layer arranged on a form second side;
- a removable release material strip arranged on said form second side; and
- a first set of die cuts arranged overlappingly on said first set of attachment features;
- wherein, said first set of attachment features is configured to secure to said second set of attachment features.

16. The tamper evident form of claim 15, wherein said adhesive layer is arranged over an entirety of said second panel on said form second side.

17. The tamper evident form of claim 15, wherein said first set of attachment features and said second set of attachment features are cohesive.

18. The tamper evident form of claim 15, wherein each of said first set of die cuts has a generally open semi-ovular shape.

19. A tamper evident form, comprising:
- a first panel;
- a second panel;
- a perimeter portion arranged outboard each of said first panel and said second panel;
- a first set of attachment features located within said perimeter portion and being adjacent said first panel on a form first side;
- a second set of attachment features located within said perimeter portion and being adjacent said second panel on said form first side;
- an adhesive strip arranged in said perimeter portion on a form second side;

a removable release material strip arranged in said perimeter portion on said form second side; and a first set of die cuts arranged overlappingly on said first set of attachment features;

wherein, said first set of attachment features is configured to secure to said second set of attachment features.

20. The tamper evident form of claim 19, wherein said adhesive strip is arranged adjacent said first panel and said removable release material strip is arranged adjacent said second panel.

* * * * *